US011877645B2

(12) United States Patent
Jimenez et al.

(10) Patent No.: US 11,877,645 B2
(45) Date of Patent: Jan. 23, 2024

(54) PERSONAL CARE IMPLEMENT

(71) Applicant: Colgate-Palmolive Company, New York, NY (US)

(72) Inventors: Eduardo Jimenez, Manalapan, NJ (US); Daniel Wainless, New Brunswick, NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 17/320,511

(22) Filed: May 14, 2021

(65) Prior Publication Data

US 2022/0361654 A1 Nov. 17, 2022

(51) Int. Cl.
*A46B 5/02* (2006.01)
*B25G 1/10* (2006.01)

(52) U.S. Cl.
CPC .............. *A46B 5/021* (2013.01); *B25G 1/102* (2013.01); *A46B 2200/1066* (2013.01)

(58) Field of Classification Search
CPC .. A46B 5/00; A46B 5/02; A46B 5/021; A46B 5/023; A46B 5/025; A46B 5/026; A46B 5/028; A46B 9/04; B25G 1/102; Y10T 16/476; Y10T 16/48; Y10T 16/498
USPC ........................................................ 15/143.1
See application file for complete search history.

(56) References Cited

U.S. PATENT DOCUMENTS

| | | | |
|---|---|---|---|
| 2,317,123 A | 4/1943 | Warp | |
| 3,302,230 A | 2/1967 | Poppelman | |
| 5,339,482 A | 8/1994 | Desimone et al. | |
| 5,908,038 A | 6/1999 | Bennett | |
| 6,588,113 B2 * | 7/2003 | Bozikis | B26B 21/52 264/173.17 |
| 6,601,272 B2 | 8/2003 | Stvartak et al. | |
| 6,687,940 B1 | 2/2004 | Gross et al. | |
| 7,047,591 B2 | 5/2006 | Hohlbein | |
| 7,415,788 B2 | 8/2008 | Little | |
| 7,458,125 B2 | 12/2008 | Hohlbein et al. | |

(Continued)

FOREIGN PATENT DOCUMENTS

| | | |
|---|---|---|
| CN | 201365646 | 12/2009 |
| EP | 3804560 | 4/2021 |

(Continued)

OTHER PUBLICATIONS

International Search Report and the Written Opinion of the International Searching Authority issued in International Application PCT/US2022/029124 dated Sep. 7, 2022.

(Continued)

*Primary Examiner* — Lee D Wilson
*Assistant Examiner* — Alberto Saenz

(57) ABSTRACT

A personal care implement that uses less plastic by removing material from a handle of the oral care implement while maintaining a comfortable grip which is similar to a normal grip that a user associates with a personal care implement. That is, the handle has a recess in a rear surface thereof, such that the handle or a portion thereof has a U-shaped transverse cross-sectional area. Portions of the handle may be covered with an elastomeric material to increase gripability and comfort. The handle may also include various rib structures elongated along the recess to increase the strength of the handle so that it does not significantly deform during normal use.

19 Claims, 23 Drawing Sheets

(56) References Cited

U.S. PATENT DOCUMENTS

| | | | |
|---|---|---|---|
| 8,046,864 | B2 | 11/2011 | Baertschi et al. |
| 8,161,591 | B2 | 4/2012 | Gatzemeyer et al. |
| 8,549,691 | B2 | 10/2013 | Moskovich et al. |
| 9,167,890 | B2 | 10/2015 | Hohlbein |
| 9,565,926 | B2 | 2/2017 | Xi et al. |
| D798,061 | S | 9/2017 | Jimenez |
| 9,756,931 | B2 | 9/2017 | Newman et al. |
| D851,411 | S | 6/2019 | Wainless et al. |
| D854,335 | S | 7/2019 | Hielscher et al. |
| D870,460 | S | 12/2019 | Ballmaier et al. |
| D877,519 | S | 3/2020 | Xi et al. |
| D894,612 | S | 9/2020 | Zhang |
| 10,925,384 | B2 | 2/2021 | Hohlbein et al. |
| D943,283 | S | 2/2022 | Xie et al. |
| D944,531 | S | 3/2022 | Brönner |
| D961,936 | S | 8/2022 | Blachford et al. |
| D965,984 | S | 10/2022 | Lee |
| D976,009 | S | 1/2023 | Gan |
| 2006/0118130 | A1 | 6/2006 | Little et al. |
| 2012/0222228 | A1 | 9/2012 | Natividad |
| 2016/0073769 | A1* | 3/2016 | Xi ...................... A46B 15/0087 15/143.1 |
| 2022/0395085 | A1 | 12/2022 | To |
| 2022/0400843 | A1 | 12/2022 | Hatada et al. |

FOREIGN PATENT DOCUMENTS

| | | |
|---|---|---|
| KR | 20120065929 | 6/2012 |
| WO | 2001/058306 | 8/2001 |
| WO | 2005/122827 | 12/2005 |
| WO | 2006/125597 | 11/2006 |
| WO | 2007/053034 | 5/2007 |
| WO | 2011/075133 | 6/2011 |
| WO | 2012/105964 | 8/2012 |
| WO | 2013/078355 | 5/2013 |

OTHER PUBLICATIONS

Colgate PerioGard Brosse a dents, posted on Jun. 16, 2022 [online], retrieved from internet, https://www.amazon.fr/dp/B0B3Y5NVM4/?th=1 (Year 2022).

* cited by examiner

PERSONAL CARE IMPLEMENT

BACKGROUND

Personal care implements such as toothbrushes are commonly formed from plastic. It is now well established that plastic pollution is one of the most pressing environmental issues that must be addressed. Plastic does not decompose, and therefore all plastic that has ever been produced is still present in one form or another. While recycling has made a small impact on the reduction of plastics in landfills and oceans, there remains far too much plastic in the products used by consumers in everyday life. Furthermore, plastic is made from materials that include coal, salt, crude oil, and toxic materials such as benzene and vinyl hydrochloride. Many goods manufacturers are therefore working to reduce their plastic output to reduce the amount of plastic sitting in landfills and oceans. The invention described herein seeks to address these issues by reducing the amount of plastic in personal care implements such as toothbrushes without negatively affecting consumer enjoyment during use of the same.

BRIEF SUMMARY

The present invention is directed to a personal care implement that uses less plastic by removing material from a handle of the oral care implement while maintaining a comfortable grip which is similar to a normal grip that a user associates with a personal care implement. That is, the handle has a recess in a rear surface thereof, such that the handle or a portion thereof has a U-shaped transverse cross-sectional area. Portions of the handle may be covered with an elastomeric material to increase gripability and comfort. The handle may also include various rib structures elongated along the recess to increase the strength of the handle so that it does not significantly deform during normal use.

In one aspect, the invention may be a personal care implement comprising: a body extending along a longitudinal axis and comprising a head configured to perform a personal care function and a handle configured to be gripped by a user during performance of the personal care function, the handle comprising a thumb grip portion and a finger grip portion that extends from the thumb grip portion to a distal end of the handle that is located furthest from the head; and wherein the finger grip portion of the handle has a generally U-shaped transverse cross-sectional area along an entirety of a length of the finger grip portion from the distal end of the handle to the thumb grip portion of the handle.

In another aspect, the invention may be a personal care implement having a longitudinal axis and comprising: a head configured to perform a personal care function; a handle coupled to the head and configured to be gripped by a user during performance of the personal care function, the handle comprising a distal axial portion that comprises a distal end of the handle that is located furthest from the head; and wherein the distal axial portion of the handle comprises: a recess that is elongated in a direction of the longitudinal axis; a first portion formed from a rigid material and comprising a front surface that is convex in a direction transverse to the longitudinal axis, a rear surface opposite the front surface that forms a floor of the recess and is concave in the direction transverse to the longitudinal axis, and a distal edge extending between the front and rear surfaces that at least partially surrounds the recess; and a second portion formed from an elastomeric material that covers the distal edge of the first portion.

In yet another aspect, the invention may be a personal care implement having a longitudinal axis and comprising: a head configured to perform a personal care function; a handle coupled to the head and configured to be gripped by a user during performance of the personal care function, the handle comprising a distal axial portion that comprises a distal end of the handle that is located furthest from the head; wherein the distal axial portion of the handle comprises: an arcuate shaped rigid portion having a convex front surface, a concave rear surface, and a distal edge extending between the convex front surface and the concave rear surface; and an elastomeric portion covering and extending from the distal edge of the arcuate shaped rigid portion.

In still another aspect, the invention may be a personal care implement comprising: a body extending along a longitudinal axis and comprising a head configured to perform a personal care function and a handle coupled to the head and configured to be gripped by a user during performance of the personal care function, the body comprising: a skeleton portion that forms a base structure of the handle and an entirety of the head, the base structure of the handle comprising a front surface, a rear surface, and a peripheral surface extending between the front and rear surfaces, the base structure of the handle comprising a recess along a distal axial portion of the handle, the rear surface of the base structure forming a floor of the recess; and a monolithic overmold portion covering a portion of the front, rear, and peripheral surfaces of the base structure and comprising a rib structure that extends along the longitudinal axis and protrudes from the floor of the recess.

In a further aspect, the invention may be a personal care implement comprising: a body extending along a longitudinal axis and comprising a head and a handle, the handle comprising: a base structure comprising a front surface, a rear surface opposite the front surface, and a recess, the rear surface of the base structure forming a floor of the recess; and a monolithic overmold portion comprising a rib structure that is elongated along the longitudinal axis and protrudes from the floor of the recess.

In a still further aspect, the invention may be a personal care implement comprising: a head configured to perform a personal care function; and a handle configured for gripping by a user, the handle comprising: an outer surface; a first recess formed into the outer surface, the first recess having a floor; and a first rib protruding from the floor of the first recess; and a cover member comprising a second recess having a floor and a second rib protruding from the floor of the second recess; and wherein the cover member is coupled to the handle so that the first and second ribs contact one another and the first and second recesses collectively define a handle cavity.

In yet another aspect, the invention may be a personal care implement comprising: a head configured to perform a personal care function; and a handle configured for gripping by a user, the handle comprising: an outer surface; a first recess formed into the outer surface, the first recess having a floor; and a first rib protruding from the floor of the first recess; a cover member comprising a second recess; and wherein the cover member is coupled to the handle so that the first and second recesses collectively define a handle cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
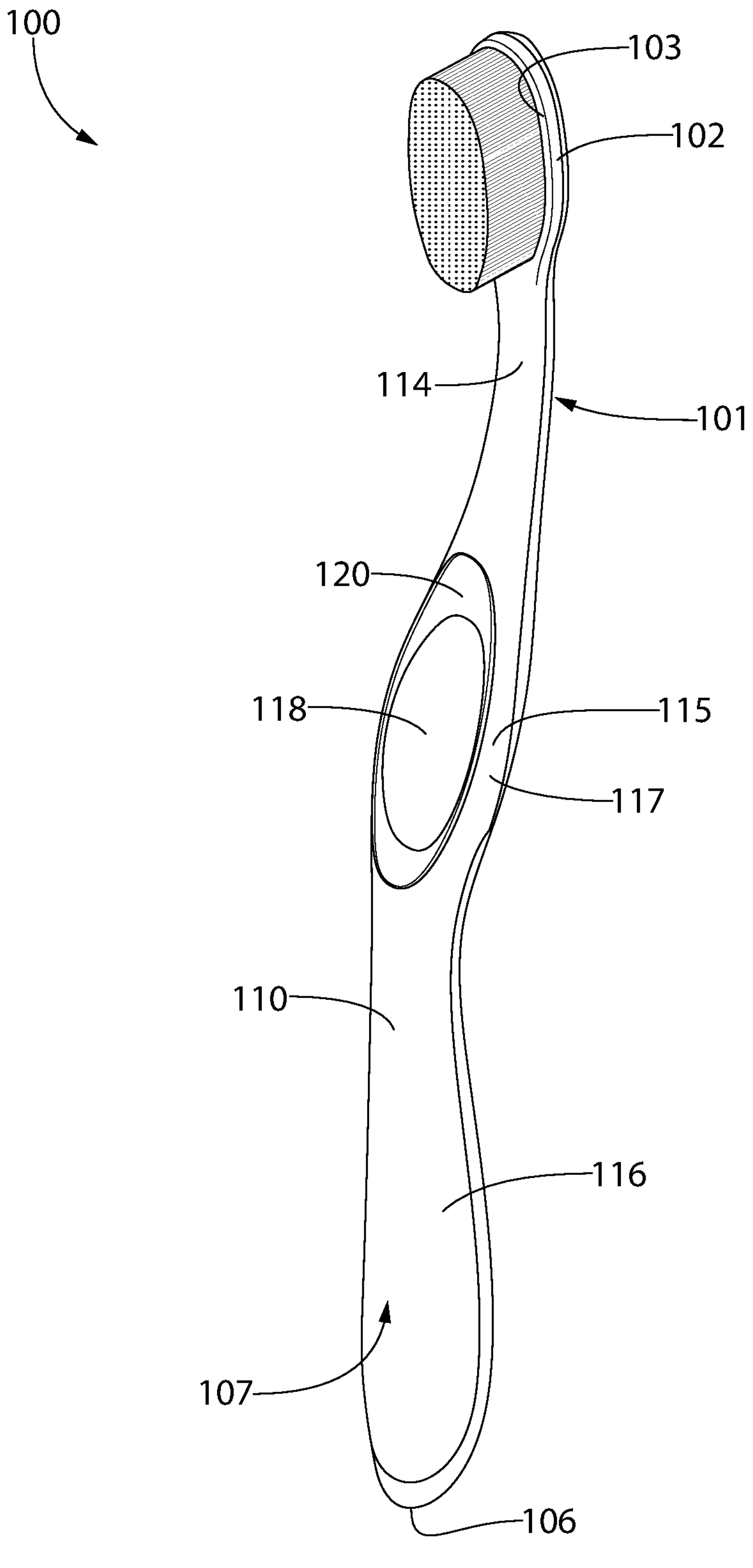
FIG. 1 is a front perspective view of a personal care implement in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring first to FIGS. 1-4, a personal care implement 100 will be described in accordance with an embodiment of the present invention. In the exemplified embodiment, the personal care implement 100 is a toothbrush, and more particularly a manual toothbrush. However, the invention is not to be so limited in all embodiments and the personal care implement 100 may take on other forms and be used for other purposes in other embodiments. For example, the personal care implement 100 may be an electric toothbrush in some alternative embodiments. In still other embodiments, the personal care implement 100 may perform other functions, such as being a flosser device, a tooth scraper, a tongue cleaner, or any of the various other tools that are commonly used for oral care. In yet other embodiments, the personal care implement 100 may be an implement used for personal care unrelated to the mouth, such as being a razor, an applicator, a hairbrush, or the like. The invention described herein relates predominately to the handle of the personal care implement 100, and thus the invention can be incorporated into implements of varying types which have handles for gripping and are used for different functions and purposes.

The personal care implement 100 comprises a body 101 that extends along a longitudinal axis A-A. The body 101 comprises a head 102 and a handle 110 that are connected together as a unitary part. The head 102 has a front surface 103 and a rear surface 104 opposite the front surface 103. Furthermore, the personal care implement 100 comprises a plurality of tooth cleaning elements 105 extending from the front surface 103 of the head 102. The tooth cleaning elements 105 may take on different forms, including being nylon bristles, elastomeric lamella, or the like. Moreover, when the tooth cleaning elements 105 are bristles, such bristles may include end-rounded bristles, spiral bristles, tapered bristles, and the like. The tooth cleaning elements 105 may be coupled to the head using various known technologies including staples, anchor-free tufting, Ptt, in-mold tufting, and the like. Thus, in the exemplified embodiment the personal care implement 100 is an oral care implement, and more specifically a toothbrush. However, in other embodiments the head 102 may not include tooth cleaning elements, for example where the personal care implement 100 is a razor or other type of device. The head 102 is configured to perform a personal care function, and thus depending on the specific personal care function to be performed, the head 102 will have additional features such as tooth cleaning elements, blades, flosser devices, applicators, or the like. A tongue cleaner may be provided on the rear surface 104 of the head 102 in some embodiments as well.

The handle 110 extends from the head 102 to a distal end 106, which is the end of the handle 110 located furthest from the head 102. The handle 110 comprises a front surface 107 which faces the same direction as the front surface 103 of the head 102 and a rear surface 108 which faces the same direction as the rear surface 104 of the head 102. The handle 110 can be divided axially into a plurality of different axial sections. Specifically, the handle 110 comprises a proximal axial section 111 located adjacent to the head 102, a distal axial section 113 located adjacent to and comprising the distal end 106 of the handle 110, and a central axial section 112 located between the proximal and distal axial sections 111, 113. The proximal axial section 111 of the handle 110 comprises a neck 114 of the handle 110. The central axial section 112 of the handle 110 comprises a thumb grip portion 115 of the handle 110. The distal axial section 113 of the handle 110 comprises a finger grip portion 116 of the handle 110. That is, when a user grips the handle 110 in a traditional manner, the user's thumb will rest along the thumb grip portion 115 (i.e., along the central axial section 112) and the user's fingers will wrap around the finger grip portion 116 (i.e., the distal axial section 113). The head 102 and potentially part of the neck 114 (i.e., the proximal axial section 111) may enter the user's mouth or oral cavity during use of the personal care implement, particularly in the exemplified embodiment whereby the personal care implement 100 is a toothbrush.

The body 101 is formed from a hard plastic material such as polypropylene, and may include elastomeric materials such as thermoplastic elastomers or the like overmolded onto the hard plastic material, as discussed in more detail below. The term thermoplastic elastomer includes, without limitation, Styrenic block copolymers, Thermoplastic polyolefinelastomers, Thermoplastic Vulcanizates, Thermoplastic polyurethanes. Thermoplastic copolyester, Thermoplastic polyamides, and not classified thermoplastic elastomers.

In the exemplified embodiment, the thumb grip portion 116 of the handle 110 comprises a rigid portion 117 (i.e., a portion formed of a rigid material such as a hard plastic material as noted above, which is formed as an integral part of the body 101) and a thumb grip component 118 formed from an elastomeric material, such as the materials noted above. The thumb grip component 118 is distinct from the body 101 and is injection molded onto the body 101 along the rigid portion 117 of the thumb grip portion 116. The rigid portion 117 comprises a through-hole 119 that extends through the handle 110 along the thumb grip portion 116 thereof from the front surface 107 to the rear surface 108. The through-hole 119 is oval in the exemplified embodiment, but may take on other shapes in other embodiments including circular, square, rectangular, or the like.

The thumb grip component 118 is disposed within the through-hole 119, and enhances a user's grip when using the personal care implement 100. As noted, the thumb grip component 118 may be injected molded into the through-hole 119 in a second step after the formation of the body 101. Although the thumb grip component 118 is depicted as having a smooth outer surface, the outer surface may be bumpy, may include ridges or nubs, and/or may include a texture to enhance the gripability thereof. The thumb grip component 118 is formed from a resilient, elastomeric material (i.e., a thermoplastic elastomer) such that a user can apply a pressure thereon to compress or squeeze the thumb grip component 118. The thumb grip component 118 is securely coupled to the body 101 so that user applied pressure onto the thumb grip component 118 will not detach the thumb grip component 118 from the body 101.

The body 101 comprises funnel-shaped portions which surround the through-hole 119 and the thumb grip component 118. Specifically, the body 101 comprises a front funnel shaped portion 120 that at least partially surrounds the through-hole along the front surface 107 of the handle 110 and a rear funnel-shaped portion 121 that at least partially surrounds the through-hole 119 along the rear surface 108 of the handle 110. In the exemplified embodiment, the front and rear funnel-shaped portions 120, 121 are annular and completely surround the through-hole 119. Moreover, the funnel-shaped portions 120, 121 comprises concave outer surfaces. Stated another way, the front and rear surfaces 107, 108 of the body 101 are concave along the front and rear funnel-shaped portions 120, 121. The concave outer surfaces of the front and rear funnel-shaped portions 120, 121 extend from the grip component 118 to the end of the neck 114 which is located furthest from the head 102. This results in a reduction in the total amount of plastic needed to manufacture the personal care implement 100 while creating an elegant aesthetic.

Figure 5:
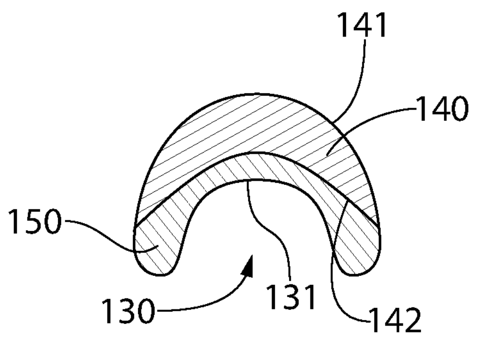
FIG. 5 is a cross-sectional view taken along line V-V of FIG. 4.
Figure 6:
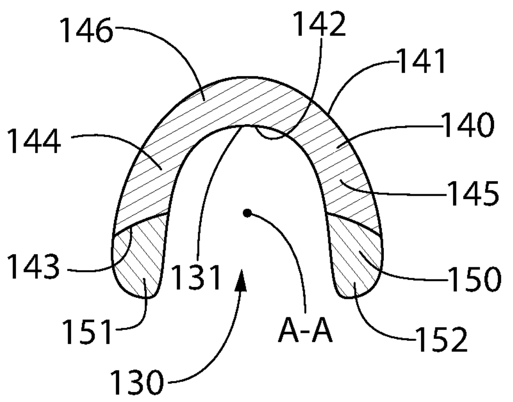
FIG. 6 is a cross-sectional view taken along line VI-VI of FIG. 4.
Figure 7:
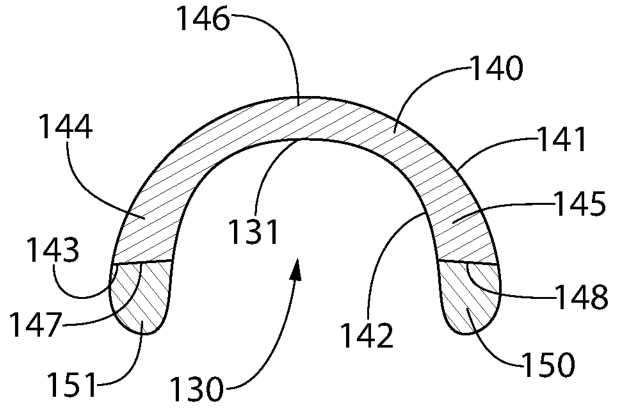
FIG. 7 is a cross-sectional view taken along line VII-VII of FIG. 4.
Figure 8:
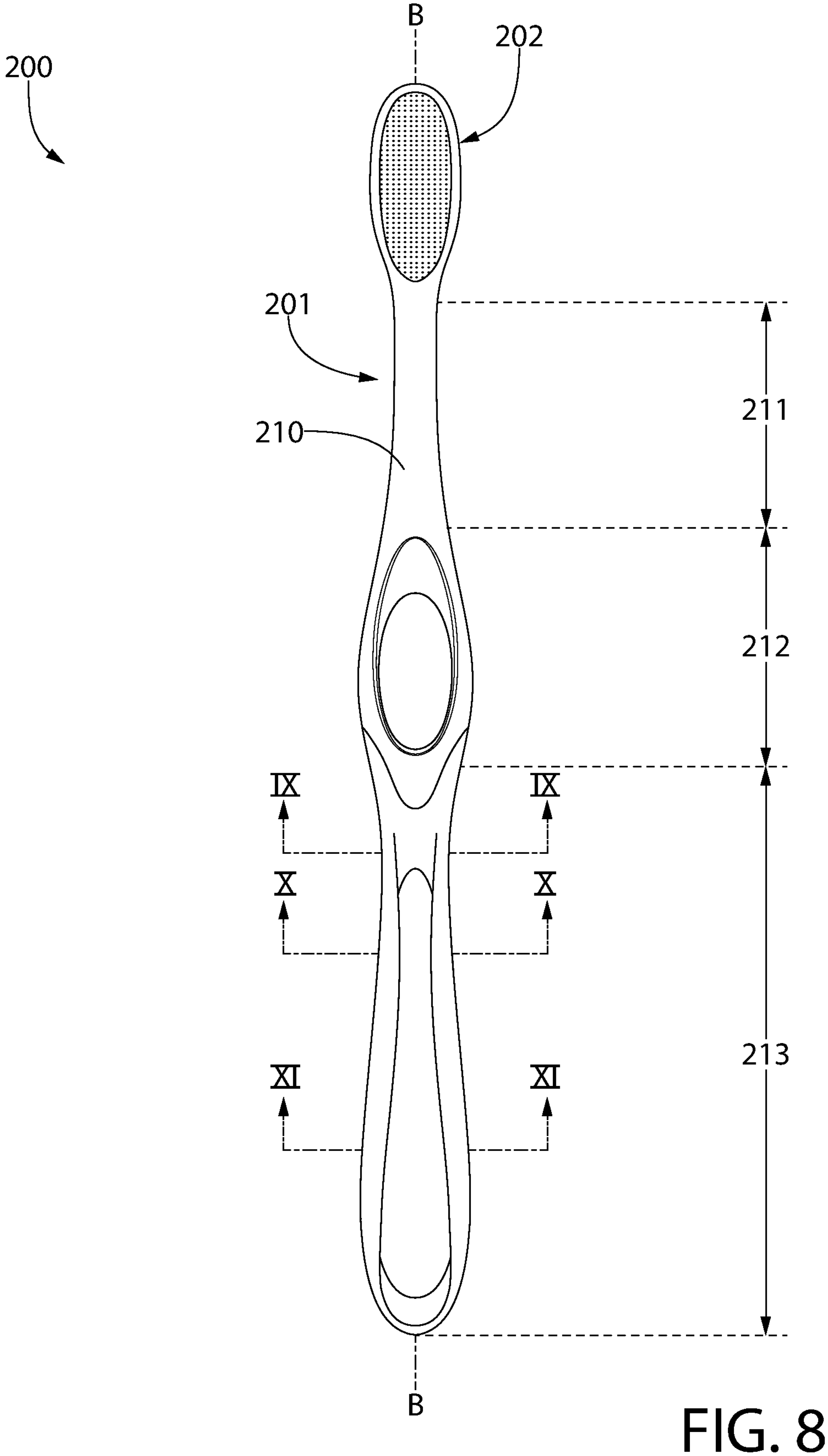
FIG. 8 is a rear view of a personal care implement in accordance with another embodiment of the present invention.
Figure 9:
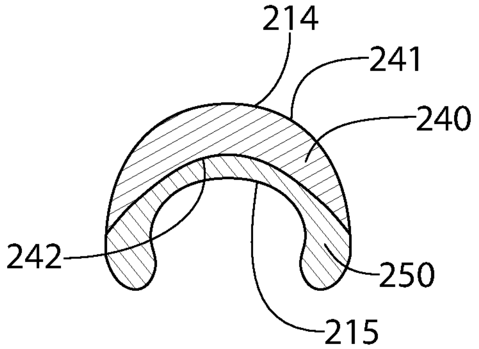
FIG. 9 is a cross-sectional view taken along line IX-IX of FIG. 8.
Figure 10:
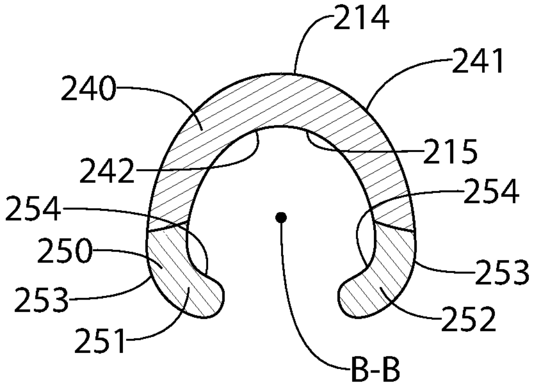
FIG. 10 is a cross-sectional view taken along line X-X of FIG. 8.
Figure 11:
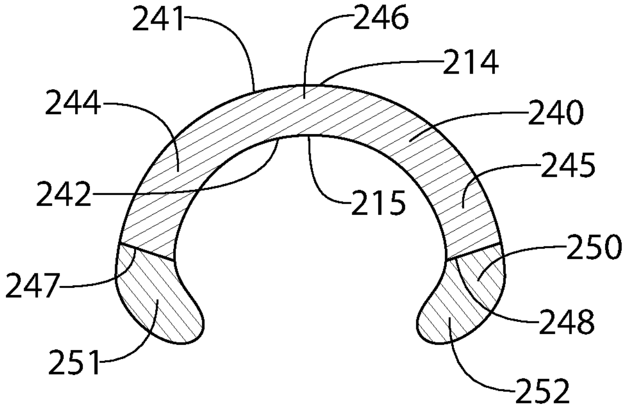
FIG. 11 is a cross-sectional view taken along line XI-XI of FIG. 8.
Figure 12:
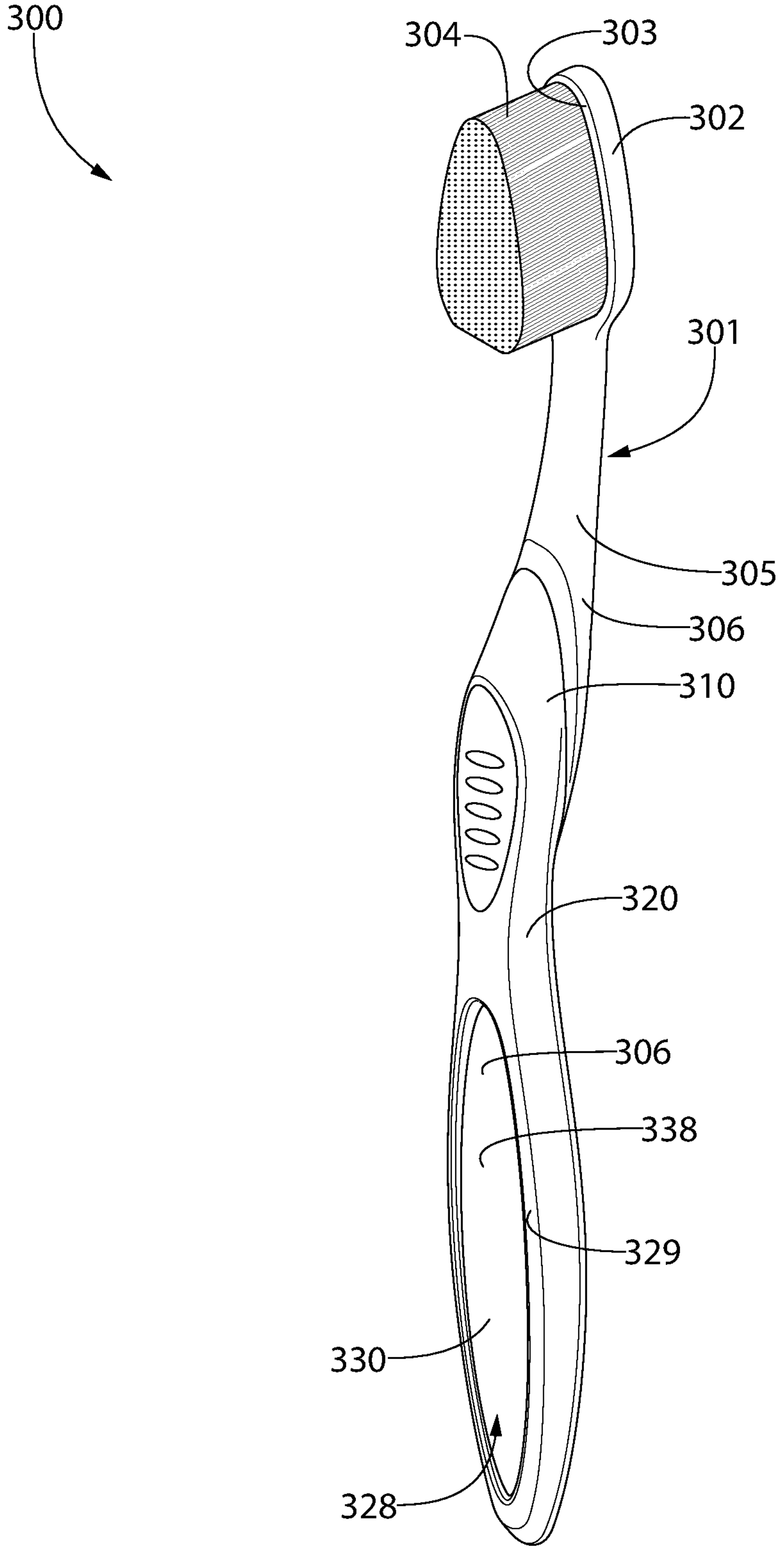
FIG. 12 is a front perspective view of a personal care implement in accordance with yet another embodiment of the present invention.
Figure 13:
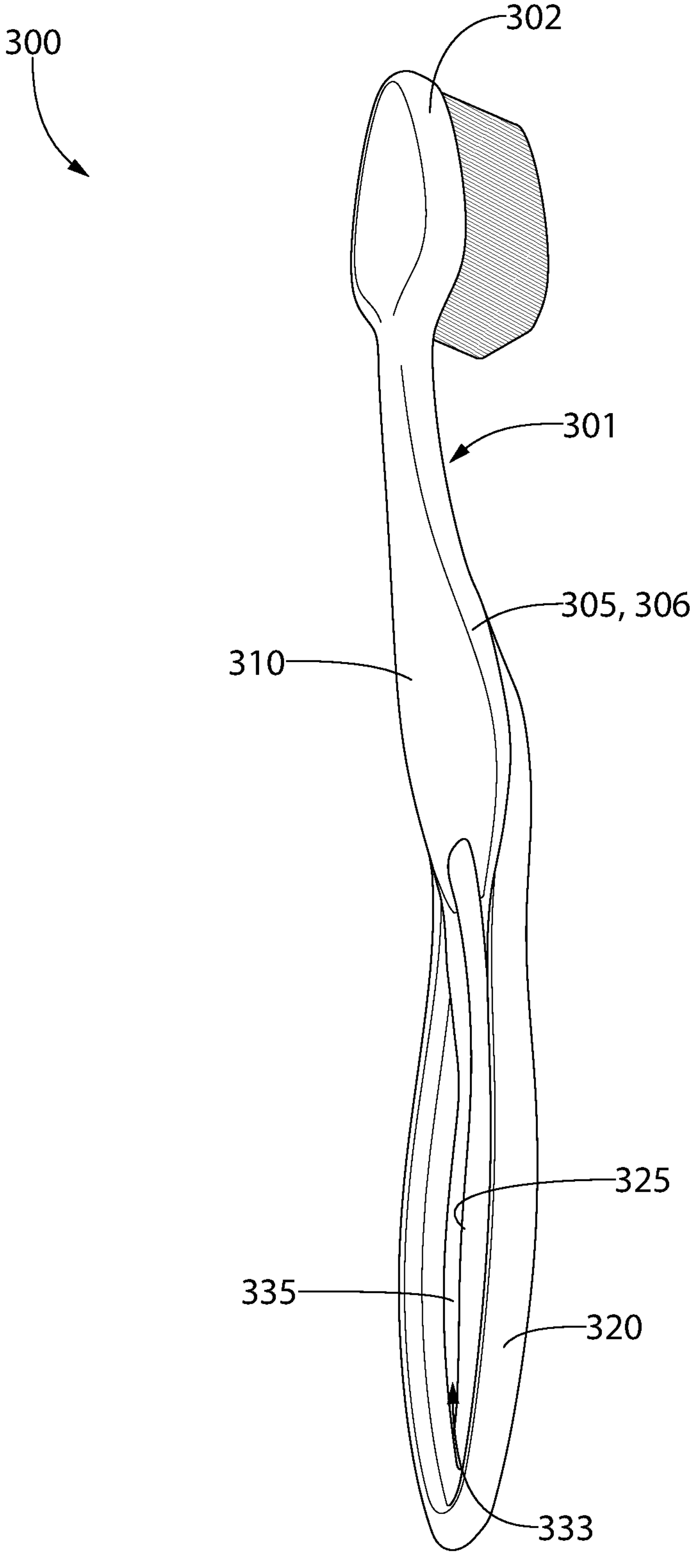
FIG. 13 is a rear perspective view of the personal care implement of FIG. 12.
Figure 14:
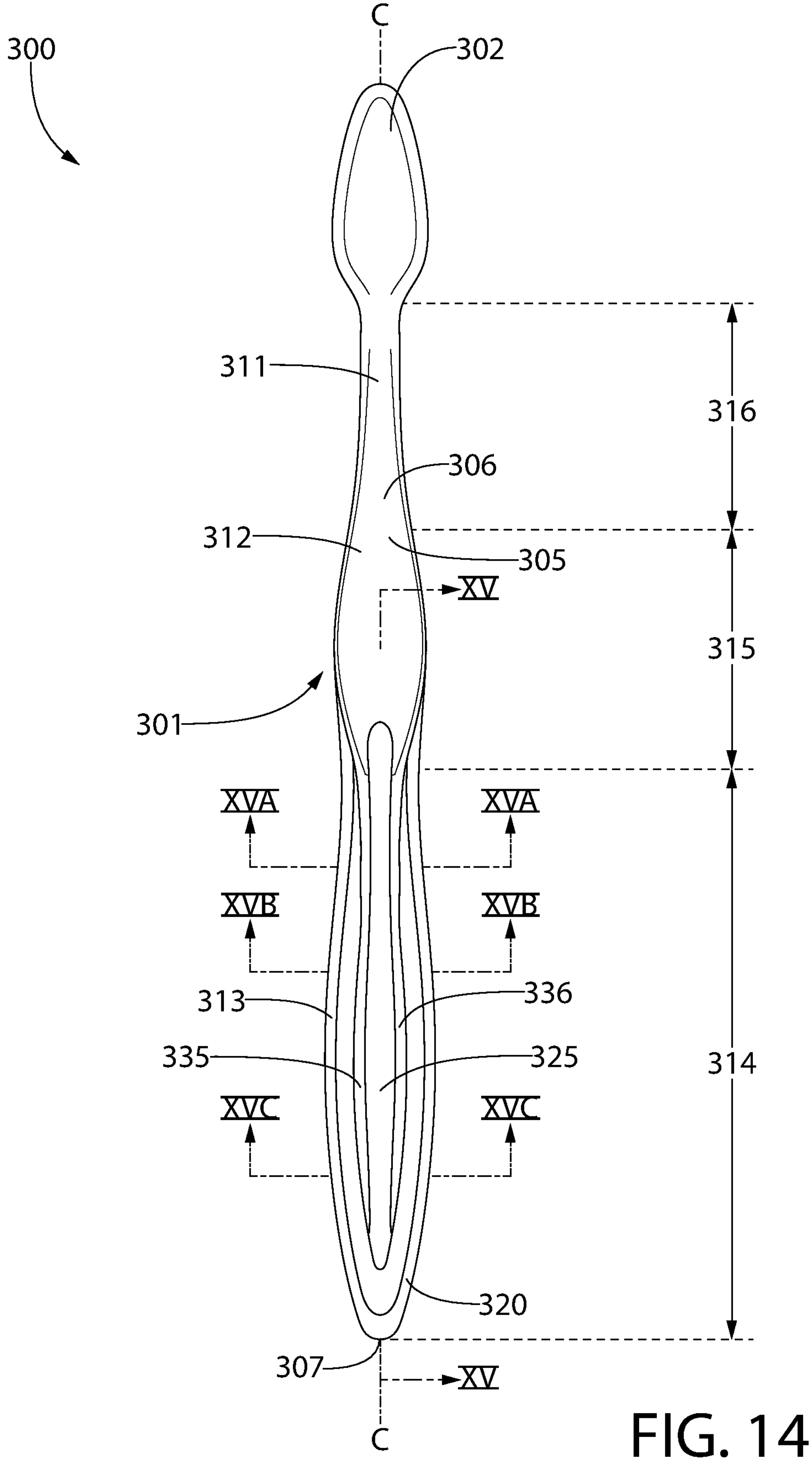
FIG. 14 is a rear view of the personal care implement of FIG. 12.

The distal axial section 113 of the handle 110 which forms the finger grip portion 116 of the handle 110 extends from the thumb grip section 115 to the distal end 106 of the handle 110. The distal axial section 113 of the handle 110 has a U-shaped transverse cross-sectional area (best shown in FIGS. 5-7 discussed below) owing to the fact that a recess 130 is formed into the rear surface 108 of the handle 101 along the distal axial section 113 thereof. The recess 130 extends from the distal end 106 of the handle 110 to the thumb grip portion 115 of the handle 110. Thus, there is no end wall at the distal end 106 of the handle 110, but instead the recess 130 is open at the distal end 106 of the handle 110. The recess 130 is elongated in the direction of the longitudinal axis A-A. Moreover, the recess 130 is formed into the rear surface 108 of the handle 110 along the distal axial section 113 (or the finger grip portion 116) of the handle 110.

Figure 3:
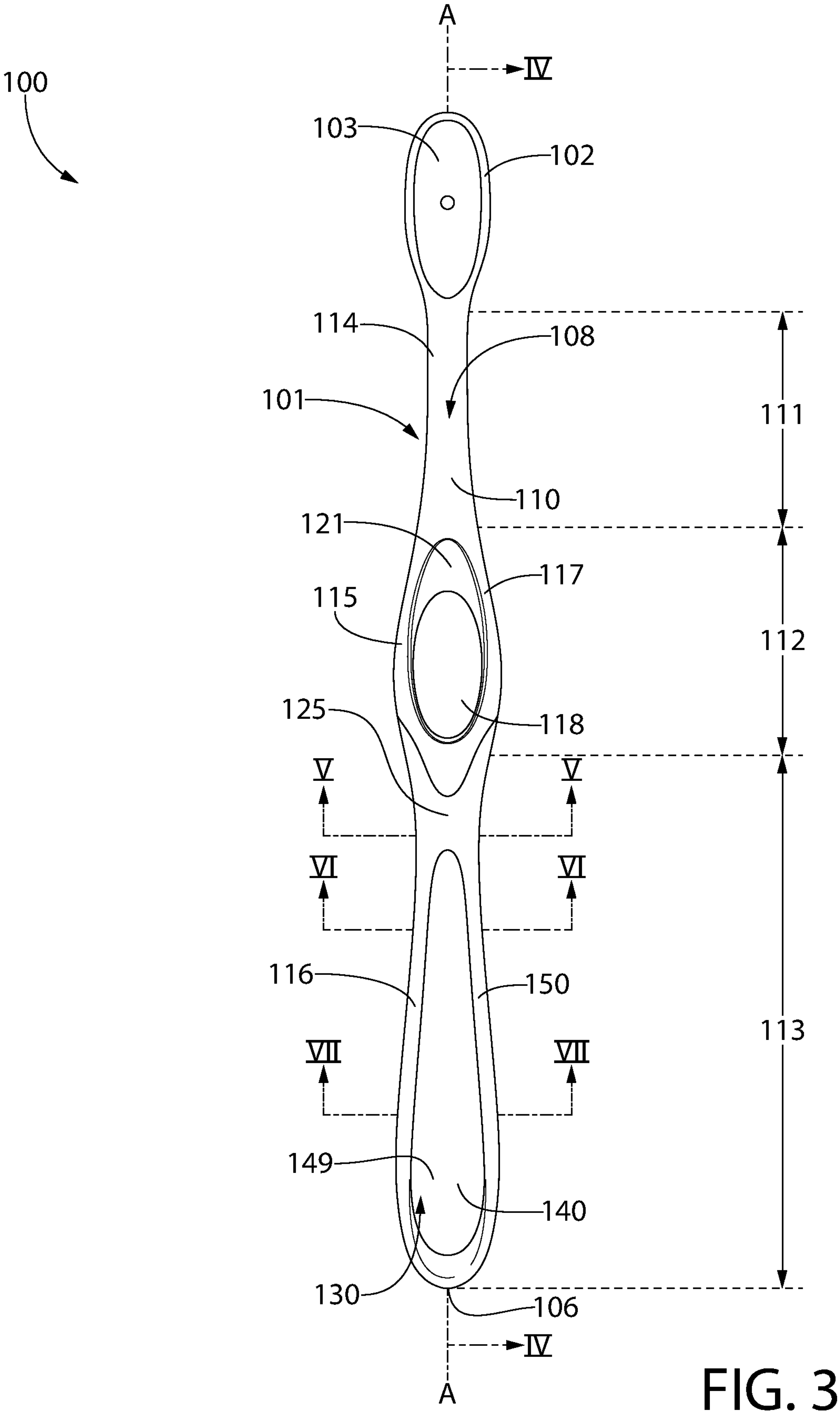
FIG. 3 is a rear view of the personal care implement of FIG. 1.

The recess 130 has a width measured in a direction transverse to the longitudinal axis A-A. The width of the recess 130 decreases along at least a portion of the length of the distal axial section 113 of the handle 110 moving in a direction from the distal end 106 of the handle 110 towards the central axial section 112 (or the thumb grip portion 115) of the handle 110. This reduction in the width of the recess 130 is best seen in FIG. 3, and also in a comparison between FIGS. 6 and 7.

Referring to FIGS. 3 and 5-7, the finger grip portion 116 of the handle 110 located along the distal axial section (or distal axial portion) 113 of the handle 110 will be further described. The distal axial section 113 of the handle 110 comprises a first portion 140 formed from a rigid material and a second portion 150 formed from an elastomeric material. The rigid material may be a hard plastic such as polypropylene or the like and the elastomeric material may be a thermoplastic elastomer or the like. The first and second portions 140, 150 may be formed from different colors in some embodiments to provide a visual contrast. The first and second portions 140, 150 are coupled together in a non-detachable manner to form the finger grip portion 116 of the handle 110 (which is also the distal axial section 113 of the handle 110). The first and second portions 140, 150 may be formed in two separate shots during an injection molding process. Specifically, the first portion 140 may form a part of the integrally formed body 101 (i.e., the body 101 comprises the first portion 140), and the second portion 150 may be injection molded onto the first portion 140 in a second shot during the injection molding process. Of course, the personal care implement 100 could be formed using other manufacturing techniques such as 3D printing or the like.

The first portion 140 forms the main structural rigid body of the distal axial section 113 of the handle 110 and the second portion 150 forms a grip surface for the user's hand and fingers during use. The first portion 140 comprises a front surface 141 and a rear surface 142 opposite the front surface. The first portion 140 is generally U-shaped owing to the recess 130 noted above. Thus the front surface 141 of the first portion 140 is convex in a direction transverse to the longitudinal axis A-A of the body 101 and the rear surface 142 of the first portion 140 is concave in the direction transverse to the longitudinal axis A-A of the body 101.

The first portion 140 also comprises a distal edge 143 that extends between the front and rear surfaces 141, 142. In the exemplified embodiment, the distal edge 143 extends between the convex front surface 141 and the concave rear surface 142. In the exemplified embodiment, the distal edge 143 faces the same direction as the rear surface 142 because the recess 130 is formed into the rear surface 130. In other embodiments, the convex front surface 141 and the concave rear surface 142 may meet directly, and in such embodiments the distal edge 143 may be the location at which those surfaces meet or intersect. The distal edge 143 may be deemed to be a part of the rear surface 142 because it is visible when the personal care implement 100 is viewed from the rear. The rear surface 142 of the first portion 140 forms at least a portion of a floor 131 of the recess 130. A remainder of the floor 131 of the recess 130 may be formed by the second portion 150 of the distal axial section 113 of the handle 110 (see FIG. 5 for example). In the exemplified embodiment, the distal axial section 113 (or the finger grip portion 116) of the handle 110 has a convex front surface and a concave rear surface (in a direction transverse to the longitudinal axis A-A) along the entire length of the distal axial section 113 from the distal end 106 to the thumb grip section 115.

The first portion 140 of the distal axial section 113 of the handle 110 comprises a first sidewall 144 located on a first side of the longitudinal axis A-A, a second sidewall 145 located on a second side of the longitudinal axis A-A, and a bight portion 146 extending between the first and second sidewalls 144, 145. The first sidewall 144 terminates in a first terminal end 147 and the second sidewall 145 terminates in a second terminal end 148. The first and second terminal ends 147, 148 collectively form the distal edge 143 of the first portion 140 of the distal axial section 113 of the handle 110. As noted above, the first and second terminal ends 147, 148 of the first and second sidewalls 144, 145 face in generally the same direction as the rear surface 142 of the first portion 140 of the distal axial section 113 of the handle 110.

The second portion 150 of the distal axial section 113 of the handle 110 is coupled to and covers various portions of the first portion 140 of the distal axial section 113 of the handle 110 to improve a user's grip thereon and make the personal care implement 100 feel and handle similar to a more traditional implement which is round in cross-section rather than U-shaped as with the personal care implement 100 illustrated and described herein. Along a proximal region 125 of the distal axial section 113 of the handle 110 that is immediately adjacent to the central axial section 112, the second portion 150 covers the rear surface 142 of the first portion 140. Thus, along the proximal region 125 of the distal axial section 113, the second portion 150 forms the floor 131 of the recess 130. Between the proximal region 125 of the distal axial section 113 of the handle 110 and the distal end 106 of the handle 110, the second portion 150 does not cover the rear surface 142 of the first portion 140. Thus, the rear surface 142 of the first portion 140 is exposed between the proximal region 125 of the distal axial section 113 and the distal end 106 of the handle 110. As best seen in FIG. 3, the second portion 150 forms a closed loop that surrounds the portion of the rear surface 142 of the first portion 140 that is exposed. Thus, along the rear surface 108 of the finger grip section 113 of the handle 110, the elastomeric material of the second portion 150 forms a closed loop that surrounds an exposed portion 149 of the rigid material of the first portion 140.

Moreover, the second portion 150 of the distal axial section 113 of the handle 110 is coupled to and covers the distal edge 143 of the first portion 140 of the distal axial section 113 of the handle 110. That is, the second portion 150 comprises a first sidewall portion 151 covering and extending from the first terminal end 147 of the first sidewall 144 of the first portion 140 and a second sidewall portion 152 covering and extending from the second terminal end 148 of the second sidewall 145 of the first portion 140. The first and second sidewall portions 151, 152 of the second portion 150 are located on opposite sides of the longitudinal axis A-A. The second portion 150 covers the entirety of the distal edge 143 of the first portion 140 including both of the first and second terminal ends 147, 148.

The first and second sidewall portions 151, 152 are not simply a very fine and thin layer covering the distal edge 143 of the first portion 140. Rather, the first and second sidewall portions 151, 152 have a perceptible height as measured from the distal edge 143 to a terminal end of the first and second sidewall portions 151, 152. The first and second sidewall portions 151, 152 may have a height in a range of 2.5 mm-5.0 mm, and more specifically 2.5 mm-3.5 mm. The height of the first and second sidewall portions 151, 152 of the second portion 150 is greater than a maximum thickness of the first portion 140 measured between the front and rear surfaces 141, 142 of the first portion 140. In some embodiments the height of the first and second sidewall portions 151, 152 is at least 2.5 mm.

While the second portion 150 covers the distal edge 143 of the first portion 140, the second portion 150 does not cover any of the front surface 141 of the first portion 140 in the exemplified embodiment. Thus, in the exemplified embodiment the front surface 141 of the first portion 140 forms the entirety of the front surface 107 of the handle 110 along the distal axial section 113 thereof. Of course, it could be possible in other embodiments for the second portion 150 to cover part of the front surface 141 of the first portion 140. Furthermore, in the exemplified embodiment the second portion 150 only covers the rear surface 142 of the first portion 140 along the proximal region 125 of the distal axial section 113 of the handle 110. Thus, along most of the length (at least 50% of the length, or more specifically at least 60% of the length, or still more specifically at least 70% of the length, or still more specifically at least 80% of the length) of the distal axial section 113 of the handle 110, the rear surface 142 of the first portion 140 is formed from the rigid material is exposed.

In this embodiment, the first and second sidewall portions 151, 152 of the second portion 150 continue the curvature of the first and second sidewalls 144, 145 of the first portion 140. Moreover, the first and second sidewall portions 151, 152 of the second portion 150 do not protrude radially beyond the front or rear surfaces 141, 142 of the first portion 140 at the terminal ends 147, 148. Stated another way, any axis perpendicular to the longitudinal axis A-A of the personal care implement 100 that extends in a direction between the front and rear surfaces 141, 142 of the first portion 140 of the distal axial section 113 of the handle 110 and that intersects the second portion 150 of the distal axial section 113 of the handle 110 also intersects the first portion 140 of the distal axial section 1130 of the handle 110. The first and second portions 140, 150 of the distal axial section 113 of the handle 110 are flush on both of the front and rear surfaces of the distal axial section 113 along interfaces where the first and second portions 140, 150 meet.

Because the second portion 150 covers the entirety of the distal edge 143 of the first portion 140, the softer second portion 150 forms an entirety of a rear edge of the distal axial section 113 of the handle 110. The second portion 150 protrudes from the distal edge 143 of the first portion 140 along the sides thereof and along the end which is adjacent to the distal end 106 of the handle 110. Thus, the second portion 150 forms the distal end 106 of the handle 110 in the exemplified embodiment.

It is important to note that the second portion 150 extends from the first portion 140 at the distal edge 143 thereof, and the second portion 150 is formed from an elastomeric material which is resilient and somewhat flimsy. Thus, a user could readily bend or fold the second portion 150. For example, when a user grips the personal care implement 100, depending on the force of the grip the first and second sidewall portions 151, 152 of the second portion 150 may bend inwardly towards one another and towards the longitudinal axis A-A. The second portion 150 will bias back to its original non-flexed position when the user force is no longer being applied. This may improve and enhance the grip feel to a user by allowing the second portion 150 to bend inwardly to more closely replicate the feel of a traditional toothbrush. Moreover, covering the hard plastic along the distal edge 143 will also enhance user comfort during use of the personal care implement 100. While not shown, the second portion 150 may nest within a recess in the distal edge 143 of the first portion, or vice versa, to enhance the attachment between the first and second portions 140, 150. Generally, however, the first and second portions 140, 150 will become adequately coupled during injection molding even without such a nested arrangement.

The finger grip portion 116 (i.e., the distal axial section 113) of the handle 110 has a front surface formed by the front surface 141 of the first portion 140 thereof and a rear surface formed collectively by the rear surface 142 of the first portion thereof and by a rear surface of the second portion 150 thereof along the proximal section 125. In some embodiments, the first portion 140 of the finger grip portion 116 of the handle 110 has a thickness measured between the front and rear surfaces 141, 142 that is between 1.5 mm and 2.5 mm. In some embodiments, the maximum thickness is no more than 2.5 mm. Thus, this is much thinner than a traditional personal care implement due to the inclusion of the recess 130 formed into the rear, which results in a significant reduction in plastic material used to form the toothbrush. This is both environmentally prudent and cost-effective.

Figure 4:
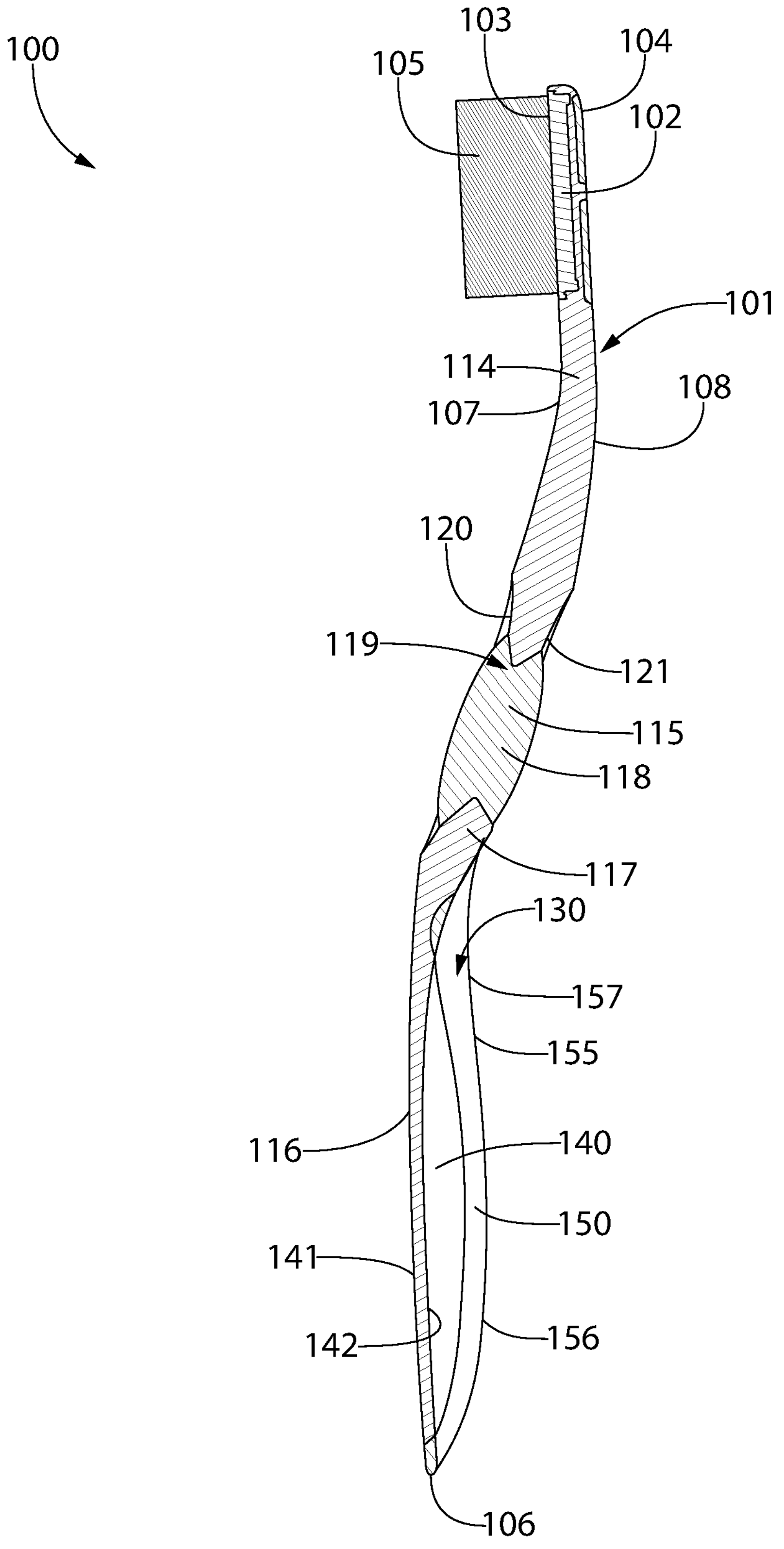
FIG. 4 is a cross-sectional view taken along line IV-IV of FIG. 4.

Referring to FIG. 4, when viewed in a side profile, the second portion 150 of the distal axial section 113 has a terminal end 155, which forms a terminal end of the finger grip portion 116. The terminal end 155 of the second portion 150 comprises a convex region 156 located adjacent to the distal end 106 of the handle 110 and a concave region 157 located adjacent to the thumb grip portion 115 (i.e., the central axial portion 112) of the handle 110.

Figure 2A:
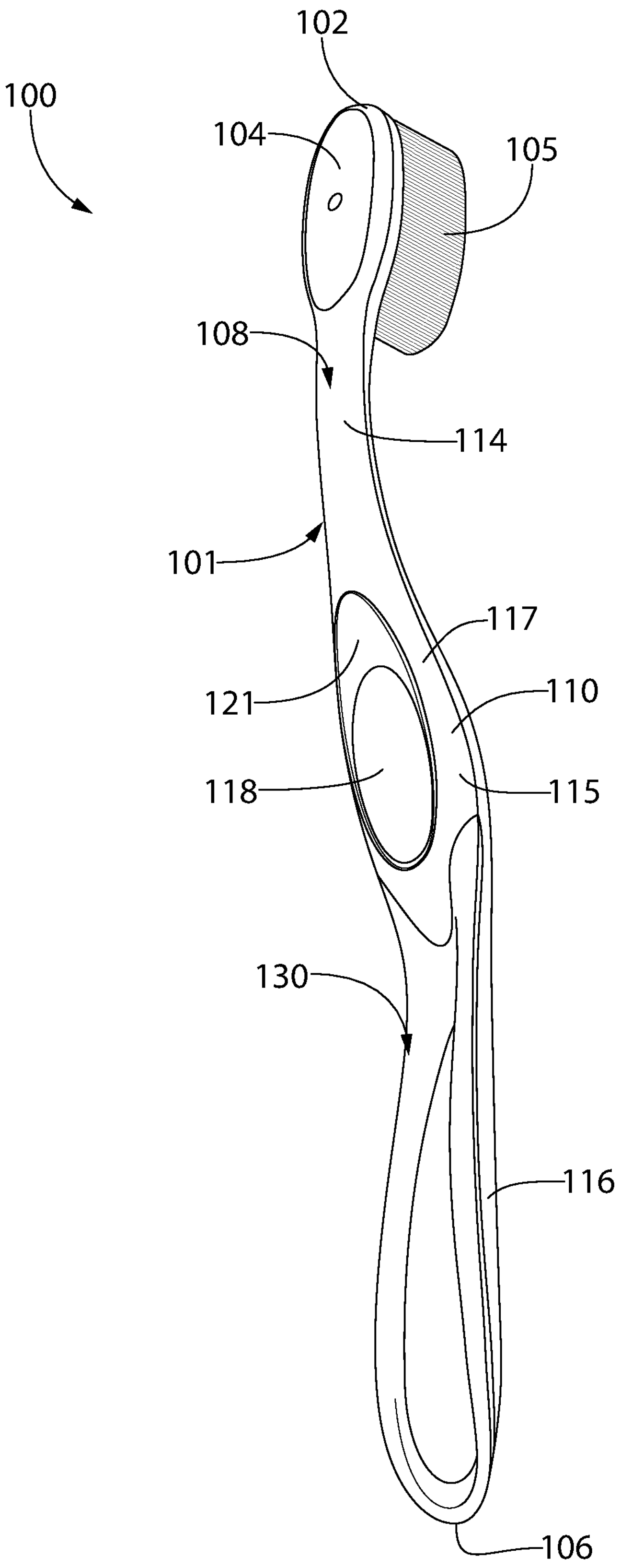
FIG. 2A is a rear perspective view of the personal care implement of FIG. 1.
Figure 2B:
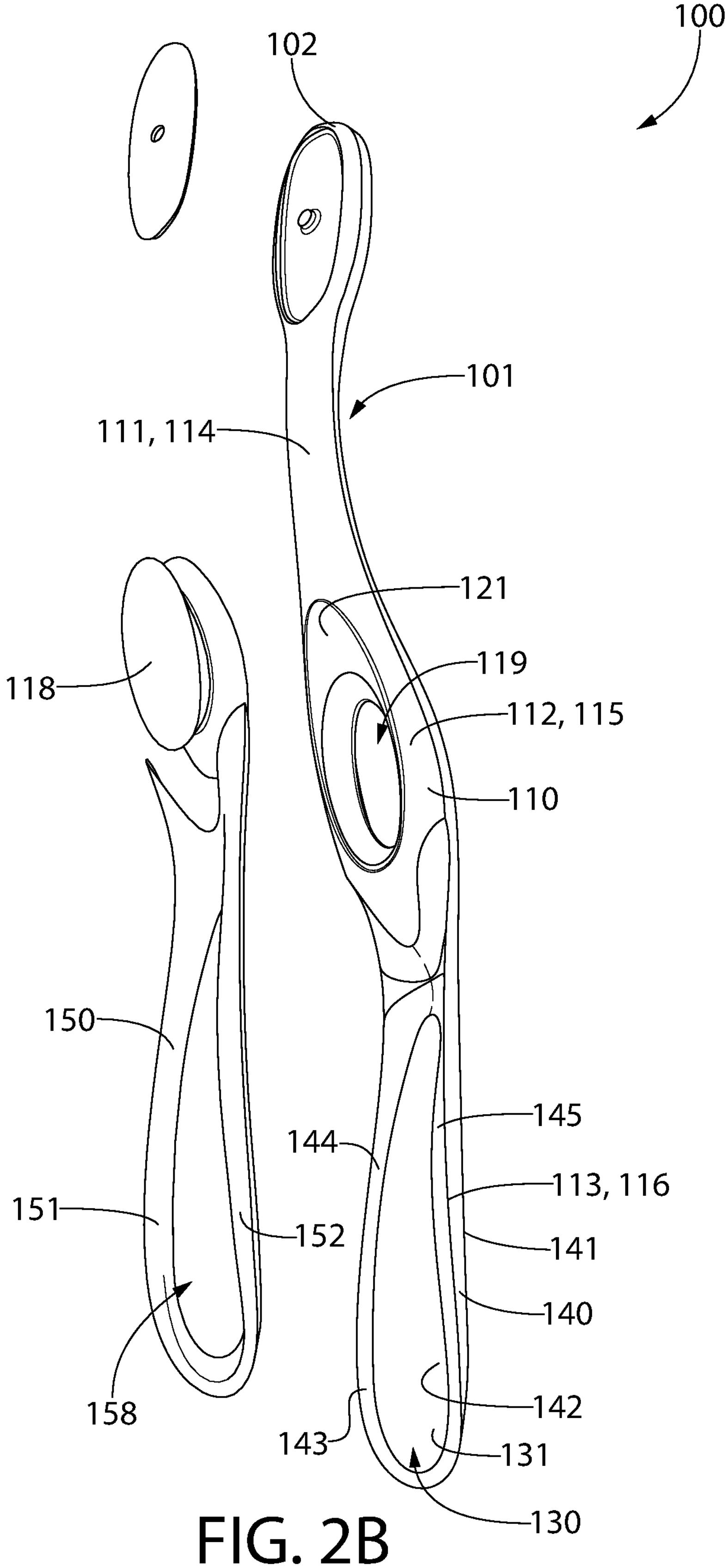
FIG. 2B is an exploded rear perspective view of the personal care implement of FIG. 1, illustrating the different parts.

As best seen in FIG. 2B, the second portion 150 of the distal axial section 113 of the handle 110 is a monolithic integral component which forms a loop-like shape that surrounds a central aperture 158. The exposed portion 149 of the first portion 140 is exposed through the central aperture 158. Thus, the second portion 150 does not extend into the recess 130 or onto the floor 131 of the recess 130, but instead covers only portions of the first portion 140 which are external to the recess 130 (said portions being described herein as the distal edge 143 of the first portion 140). The second portion 150 covers the distal edge 143 of the first portion as described herein, and then extends or protrudes from the distal edge 143 to form a flimsy, resilient rear extension to the body 101 of the personal care implement 100.

Referring to FIGS. 8-11, a personal care implement 200 is illustrated in accordance with another embodiment of the present invention. The personal care implement 200 is identical to the personal care implement 100 described above, except with regard to the distinctions noted herein. Thus, only a brief description of the general features of the personal care implement 200 will be provided herein, it being understood that the description of the personal care implement 100 provided above is entirely applicable other than the differences noted.

The personal care implement 200 comprises a body 201 comprising a head 202 and a handle 210. The handle 210 comprises a proximal axial section 211, a distal axial section 213, and a central axial section 212 located between the proximal and distal axial sections 211, 213. The head 202, the proximal axial section 211, and the central axial section 212 are identical to those same features of the personal care implement 200 and thus further discussion of those features will be omitted in the interest of brevity, it being understood that the description provided above is applicable.

The distal axial section 213 comprises a front surface 214 and a rear surface 215. The front surface 214 of the distal axial section 213 is convex in a direction transverse to a longitudinal axis B-B of the personal care implement 200. The rear surface 215 of the distal axial section 213 is concave in a direction transverse to the longitudinal axis B-B. That is, the distal axial section 213 has a U-shaped transverse cross-sectional area just like in the prior described embodiment. The distal axial section 213 may have the U-shaped transverse cross-sectional area along its entire length.

The distal axial section comprises a first portion 240 which is formed from a rigid material (e.g., a hard plastic material such as polypropylene or the like) and a second portion 250 which is formed from a resilient material (e.g., a thermoplastic elastomer). The first portion 240 comprises a front surface 241 that forms at least a portion of the front surface 214 of the distal axial section 213 and a rear surface 242 that forms at least a portion of the rear surface 215 of the distal axial section 213. In the exemplified embodiment, the front surface 241 of the first portion 240 forms the entirety of the front surface 214 of the distal axial section 213. The second portion 250 covers a portion of the rear surface 242 of the first portion 240, while leaving a remainder of the rear surface 242 of the first portion 240 exposed. Thus, the first and second portions 240, 250 collectively form the rear surface 215 of the distal axial section 213.

As with the previously described embodiment, the first portion 240 comprises a first sidewall 244, a second sidewall 245, and a bight portion 246 extending between the first and second sidewalls 244, 245. The first sidewall 244 terminates in a first terminal end 247 that extends between the front and rear surfaces 241, 242 of the first portion 240. The second sidewall 245 terminates in a second terminal end 248 that extends between the front and rear surfaces 241, 242 of the first portion 240.

The second portion 250 comprises a first sidewall portion 251 that covers and protrudes from the first terminal end 247 of the first sidewall 244 of the first portion 240. The second portion 250 also comprises a second sidewall portion 252 that covers and protrudes from the second terminal end 248 of the second sidewall 245 of the second portion 240. The extension of the first and second sidewall portions 251, 252 of the second portion 250 is the main distinction between the personal care implement 200 and the personal care implement 100. Specifically, in this embodiment the first and second sidewall portions 251, 252 are both arcuate such that they curve or curl inwardly towards one another and towards the longitudinal axis B-B. The first and second sidewall portions 251, 252 have an outer surface 253 that is flush with the front surface 241 of the first portion 240 and an inner surface 254 that is flush with the rear surface 242 of the first portion 240. The outer surfaces 253 are convex just like the front surface 241 of the first portion 240. The inner surfaces 254 are concave just like the rear surface 242 of the first portion 240.

By curling the first and second sidewall portions 251, 252 of the second portion 250 of the distal axial portion 213 of the handle 210 inwardly towards one another, the distal axial portion 213 of the handle 210 has an overall shape that is closer to that of a traditional toothbrush. Moreover, because the first and second sidewall portions 251, 252 are curled inwardly, they will be more closely aligned with the contours of a user's hand as the user grips the distal axial portion 213 of the handle 210. Similar to the embodiment previously described, the first and second sidewall portions 251, 252 are flexible and resilient because they are formed from a thermoplastic elastomer. Thus, a user's grip may cause the first and second sidewall portions 251, 252 to flex inwardly towards longitudinal axis B-B and/or towards or into the recess 130.

Referring to FIGS. 12-16C, a personal care implement 300 will be described in accordance with another embodiment of the present invention. The personal care implement 300 comprises a body 301 extending along a longitudinal axis C-C. The body 301 comprises a head 302 that is configured to perform a personal care function (such as, without limitation, tooth brushing) and a handle 310 that is configured to be gripped by a user during performance of the personal care function. In this embodiment, the head 302 comprises a front surface 303 and tooth cleaning elements 304 that extend from the front surface 303. However, as described above, the tooth cleaning elements 304 could be replaced with other features depending on the particular personal care function to be performed with the personal care implement 300.

The body 101 comprises a skeleton portion 305 that forms a base structure 306 of the handle 310 and also an entirety of the head 302. The body 301 also comprises a monolithic overmold portion 320 that is molded onto and covers parts of the base structure 306 of the skeleton portion 305. In the exemplified embodiment, the skeleton portion 305 and the overmold portion 320 are both formed from a rigid material, such as a hard plastic material which may be polypropylene or the like. However, the invention is not to be so limited in all embodiments and in other embodiments the skeleton portion 305 may be formed from a hard plastic material and the overmold portion 320 may be formed from a thermoplastic elastomer. Moreover, in some embodiments the skeleton portion 305 and the overmold portion 320 may be formed from different colors to create a desired aesthetic. While described herein as the body 301 comprising a skeleton portion 305 and an overmold portion 320, in other embodiments the body 301 may be a unitary construct such that the features described herein as being attributes of the overmold portion 320 may instead be formed directly as part of the skeleton portion 305.

The base structure 306 of the handle 310 comprises a neck portion 311 adjacent to the head 302, a finger grip portion 313 adjacent to a distal end 307 of the handle 310 that is located furthest from the head 302, and a thumb grip portion 312 located between the neck and finger grip portions 311, 313. Moreover, the handle 310 comprises a distal axial section 314 that comprises the distal end 307 of the handle, a central axial section 315, and a proximal axial section 316 located adjacent to the head 302. The distal axial section 314 of the handle comprises the finger grip portion 313 of the base structure 306 of the handle 310. The central axial section 315 of the handle 310 comprises the thumb grip portion 312 of the base structure 306. The proximal axial section 316 comprises the neck portion 311 of the base structure 306.

The base structure 306 of the handle 310 comprises a front surface 330, a rear surface 331 opposite the front surface 330, and a peripheral surface 332 that extends between the front and rear surfaces. Furthermore, the base structure 306 comprises a recess 333 along the distal axial portion 314 of the handle 310. The recess 333 is formed into the rear of the distal axial portion 314 of the handle 310 so that the rear surface 331 of the base structure 306 forms a floor 334 of the recess 333.

The base structure 306 of the handle 310 comprises a first wall 335 protruding from the floor 334 of the recess 333 on a first side of the longitudinal axis C-C and a second wall 336 protruding from the floor 334 of the recess 333 on a second side of the longitudinal axis C-C. Each of the first and second walls 335, 336 is elongated in a direction of the longitudinal axis C-C (also referred to as the axial direction). The first wall 335 terminates in a first distal end 342 and the second wall 336 terminates in a second distal end 343. An elongated channel 337 is defined by the space between the first and second elongated walls 335, 336. The elongated channel 337 is therefore also elongated in the direction of the longitudinal axis C-C. The floor 334 of the recess 333 also forms the floor of the elongated channel 337. The elongated channel 337 is aligned with and/or located on the longitudinal axis C-C in the exemplified embodiment.

The base structure 306 of the handle 310 also comprises a first sidewall portion 338 located on a first side of the longitudinal axis C-C and a second sidewall portion 339 located on a second side of the longitudinal axis C-C. Outer surfaces of the first and second sidewall portions 338, 339 form the peripheral surface 332 of the base structure 306. The first sidewall portion 338 is spaced apart from the first wall 335 by a gap that forms a first side channel 340. The second sidewall portion 339 is spaced apart from the second wall 336 by a gap that forms a second side channel 341. Each of the first and second sidewall portions 338, 339 and each of the first and second side channels 340, 341 is elongated in the direction of the longitudinal axis C-C.

The monolithic overmold portion 320 of the body 301 wraps around each of the first and second sidewall portions 338, 339 of the base structure 306 and also covers a portion of the front surface 330 of the base structure 306, a portion of the rear surface 331 of the base structure 306, and a portion of the peripheral surface 332 of the base structure 306. A first portion 321 of the monolithic overmold portion 320 nests within the first side channel 340 formed between the first sidewall portion 338 and the first wall 335. A second portion 322 of the monolithic overmold portion 320 nests within the second side channel 341 formed between the second sidewall portion 339 and the second wall 336. Furthermore, the monolithic overmold portion 320 comprises a rib structure 325 that nests within the elongated channel 337. The rib structure 325 has a height along at least portions thereof sufficient such that the rib structure 325 protrudes beyond the first and second distal ends 342, 343 of the first and second walls 335, 336. The rib structure 325 provides some added structural rigidity to the handle 310 which may be needed due to the reduced thickness of the handle 310 which results from the recess 333 formed therein.

The rib structure 325 has a height (or thickness) measured from the floor 334 of the recess 333 to a distal end 326 of the rib structure 325. The height (or thickness) of the rib structure 325 decreases moving in a direction away from the head 302 and towards the distal end 307 of the handle 310.

While in the exemplified embodiment the rib structure 325 is formed as part of the monolithic overmold portion 320, in other embodiments the personal care implement 300 may be formed as a unitary construct from a single component (i.e., the skeleton portion 305). In such embodiments, the rib structure 325 may be formed as an integral part of the skeleton portion 305. Furthermore, other features of the monolithic overmold portion 320 may either be omitted or formed also as part of the skeleton portion 305.

The rib structure 325 is spaced apart from each of the first and second sidewalls 338, 339. Thus, a first elongated channel exists between the rib structure 325 and the first sidewall 338 and a second elongated channel exists between the rib structure 325 and the second sidewall 338. Each of the first and second elongated channels are continuous along the length of the rib structure 325. That is, there are no other walls extending from the rib structure 325 towards the first or second sidewalls 338, 339. The rib structure 325 is spaced and isolated from each of the first and second sidewalls 338, 339 along an entirety of the length of the rib structure 325 and no structure exists which connects the rib structure 325 to the first or second sidewalls 338, 339.

The rib structure 325 is separated from each of the first and second portions 321, 322 of the monolithic overmold portion 320 by the first and second walls 335, 336, respectively. However, the rib structure 325 is still formed as an integral and unitary part of the monolithic overmold portion 320. In particular, the rib structure 325 is connected directly to a distal portion 323 of the monolithic overmold portion 320 which forms the distal end 307 of the handle 310. The distal portion 323 of the monolithic overmold portion 320 covers a distal end of the base structure 306 as best seen in FIG. 15.

Figure 15:
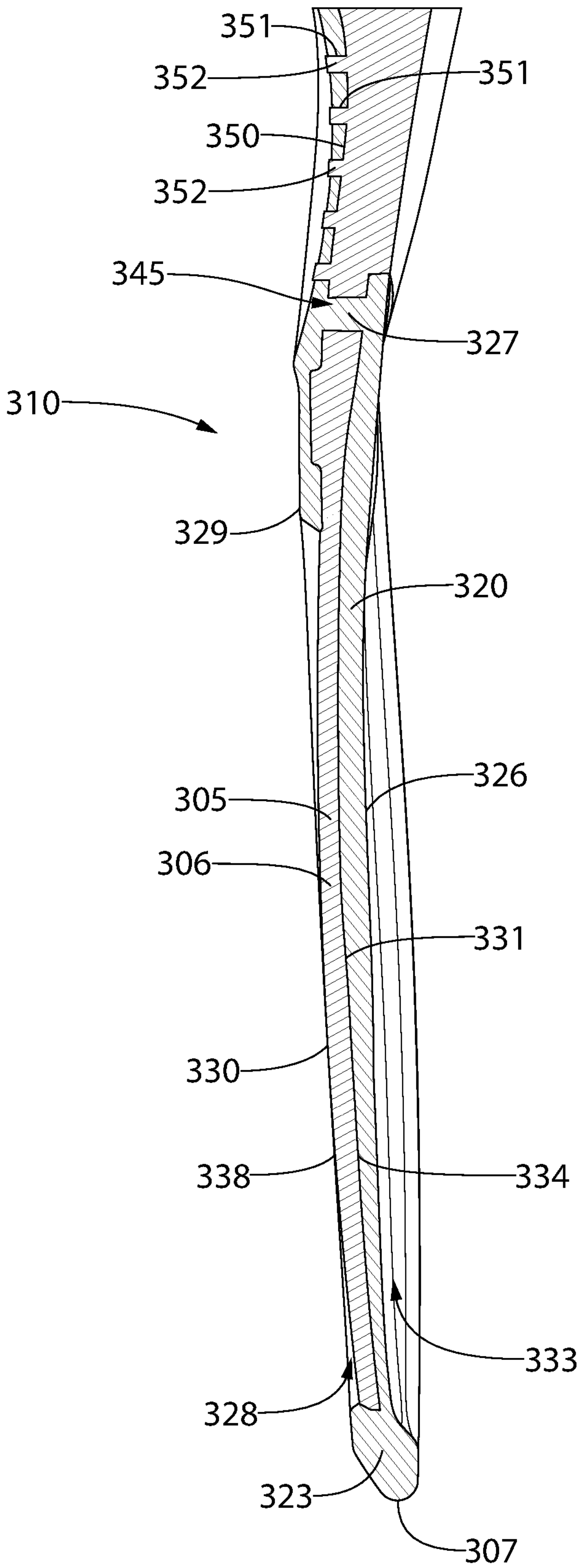
FIG. 15 is a cross-sectional view taken along line XV-XV of FIG. 14.

Furthermore, as best seen in FIG. 15, the base structure 306 of the skeleton portion 305 comprises a through-hole 345 that extends from the front surface 330 of the base structure 306 to the rear surface 307 of the base structure 306. In particular, the through-hole 345 is located along the central axial section 315 of the handle 310, which comprises the thumb grip portion 312 of the base structure 306. Of course, the through-hole 345 could be located elsewhere along the length of the handle 310. Moreover, multiple through-holes could be provided in alternative embodiments. The monolithic overmold portion 320 comprises an anchor portion 327 that is positioned within and fills the through-hole 345 in the base structure 306. In this manner, portions of the monolithic overmold portion 320 located along the front surface 330 of the base structure 306 are integrally formed with portions of the monolithic overmold portion 320 located along the rear surface 331 of the base structure 306.

The monolithic overmold portion 320 protrudes from the front surface 330 of the base structure 306. Moreover, the monolithic overmold portion 320 comprises an elongated aperture 328 through which a portion 338 of the front surface 330 of the base structure 306 of the handle 310 is exposed. The portion 338 of the front surface 330 of the base structure 306 that is exposed through the aperture 328 is recessed relative to an outer surface 329 of the monolithic overmold portion 320. The elongated aperture 328 is oval in shape and elongated in the direction of the longitudinal axis C-C in the exemplified embodiment. Indicia may be provided on the front surface 330 of the base structure 306 along the portion thereof which is exposed through the aperture 328. Such indica may include a company name or logo for purposes of product identification.

The monolithic overmold portion 320 also comprises a thumb grip section 350 that covers the front surface 330 of the base structure 306 of the handle 310 along the thumb grip portion 312 thereof. The thumb grip section 350 of the monolithic overmold portion 320 comprises a plurality of apertures 351 that are elongated in a direction transverse to the longitudinal axis C-C. Furthermore, the base structure 306 comprises a plurality of protrusions 352 located along the thumb grip portion 312 of the base structure 306 of the handle 310. The plurality of protrusions 352 protrude through the apertures 351 in the thumb grip section 350 of the monolithic overmold portion 320.

It should be noted that the recess 333 formed in the rear of the handle 310 extends continuously along the distal axial section 314 of the handle 310. The rib structure 325 is spaced apart from the portions of the monolithic overmold portion 320 that engulf the first and second sidewall portions 338, 339 of the base structure 306 along essentially the entire length of the rib structure 325. There are no walls oriented transversely relative to the longitudinal axis C-C that intersect or connect with the rib structure 325. Moreover, the distal end 326 of the rib structure 325 is recessed relative to a rear outer surface 355 of the monolithic overmold portion 320. Thus, the rib structure 325 does not protrude or stick out past the rear outer surface 355 of the monolithic overmold portion 320 (the rear outer surface 335 of the monolithic overmold portion 320 forms a rearmost part of the handle 310 of the personal care implement 300).

As with the personal care implements 100, 200, the handle 310 has a generally U-shaped cross-sectional area due to the recess 333 in the rear of the handle 310. The rib structure 325 protrudes from the curved bight portion of the U shape of the handle 310.

Figure 16A:
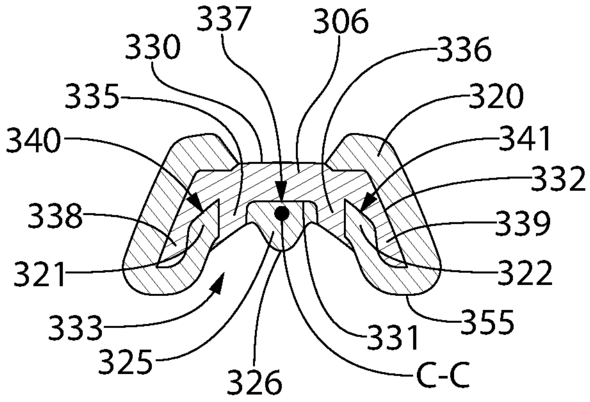
FIG. 16A is a cross-sectional view taken along line XVIA-XVIA of FIG. 14.
Figure 16B:
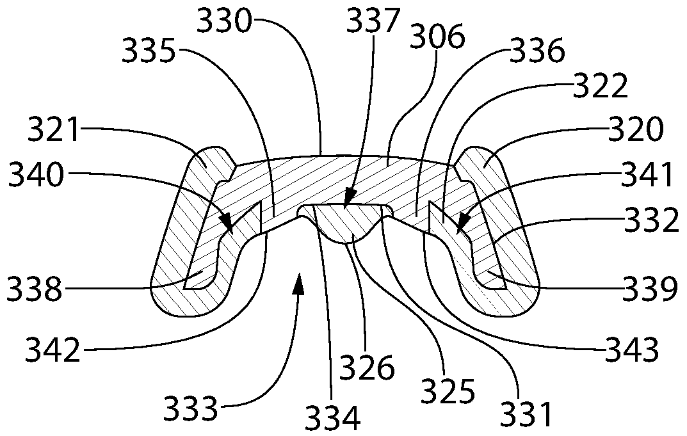
FIG. 16B is a cross-sectional view taken along line XVIB-XVIB of FIG. 14.
Figure 16C:
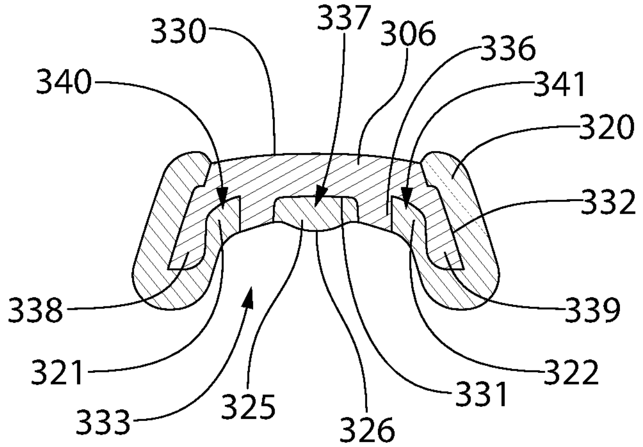
FIG. 16C is a cross-sectional view taken along line XVIC-XVIC of FIG. 14.
Figure 17A:
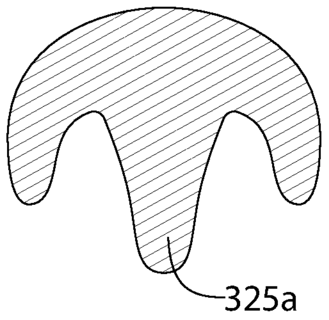
FIGS. 17A-17D are cross-sectional views taken along line XVIB-XVIB of FIG. 14 in accordance with alternative embodiments of the present invention.
Figure 17B:
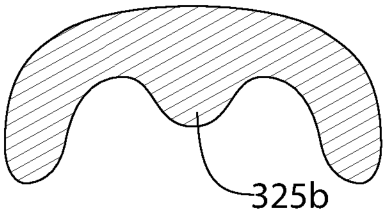
Figure 17C:
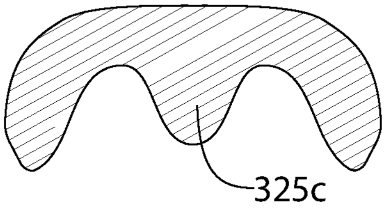
Figure 17D:
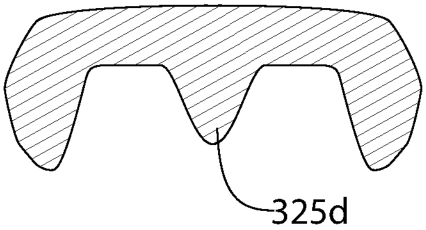

FIGS. 17A-17D illustrate alternative cross-sections taken along line XVIB-XVIB. While FIGS. 17A-17D have been simplified to only illustrate one component (rather than the two components including the base structure 306 and the monolithic overmold structure 320), it should be appreciated that the same two-component structure as shown in FIGS. 16A-16C could be implemented with the alternative structures shown in FIGS. 17A-17D. The main distinction to be covered with FIGS. 17A-17D is the different shapes of the rib structures 325*a-d*. Otherwise, the description provided above with regard to the personal care implement 300 is applicable.

Figure 18:
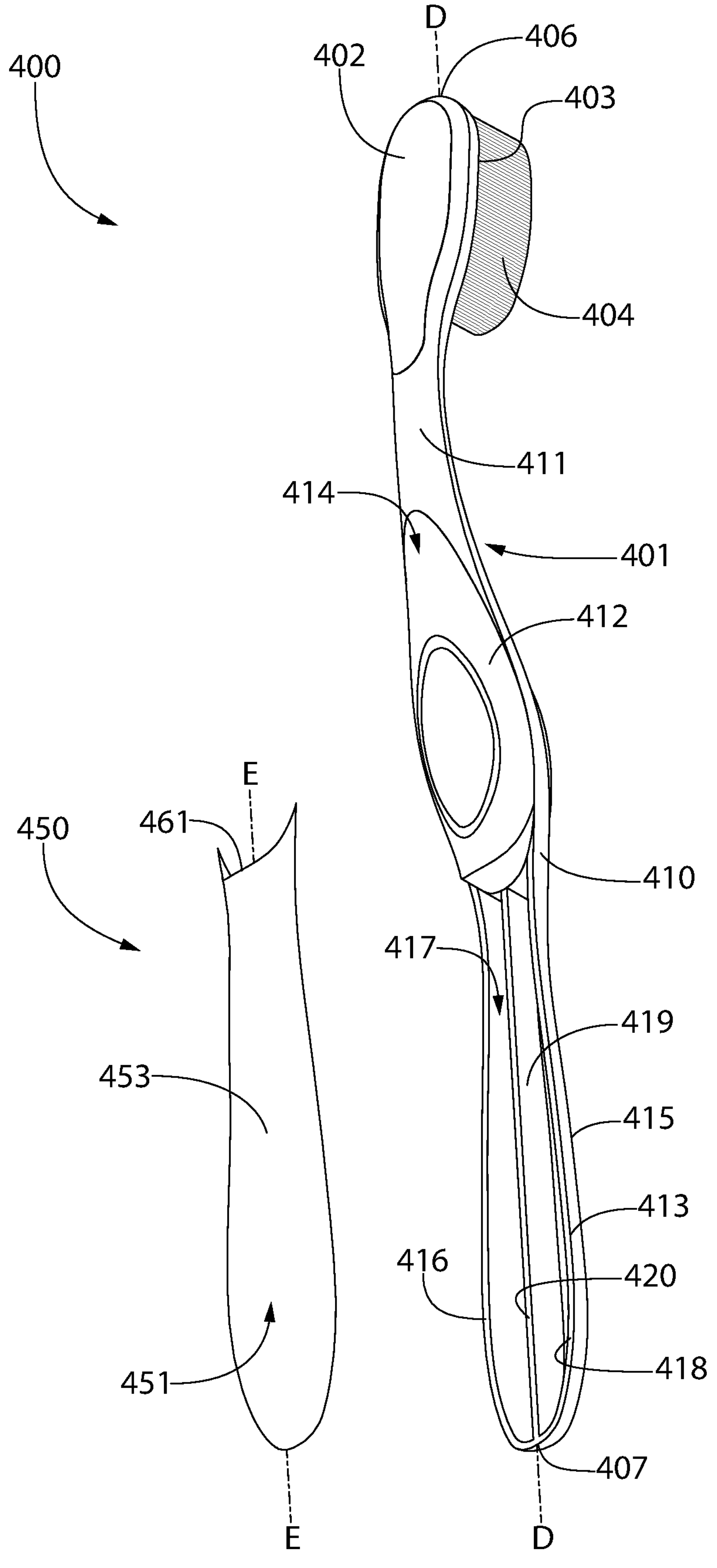
FIG. 18 is a rear perspective view of a personal care implement in accordance with still another embodiment of the present invention, whereby a cover member is detached from a body thereof.

Referring now to FIG. 18, a personal care implement 400 is illustrated in accordance with yet another embodiment of the present invention. The personal care implement 400 comprises a body 401 and a cover member 450 that is coupled to the body 401. The cover member 450 may be coupled to the body 401 using any one of various techniques, including thermal welding, snap-fit, press fit, friction fit, mechanical engagement, adhesive, or the like. In some embodiments, the cover member 450 is non-detachably coupled to the body 401 during normal use and handling of the personal care implement 400.

The body 401 is formed from a rigid material such as a hard plastic (e.g., polypropylene or the like). The body 401 extends along a longitudinal axis D-D from a proximal end 406 to a distal end 407. The body 401 comprises a head 402 that is configured to perform a personal care function and a handle 410 that is configured for gripping by a user. The head 402 comprises a front surface 403 and there are tooth cleaning elements 404 extending from the front surface 403. The tooth cleaning elements 404 will not be described in detail here, it being understood that the descriptions provided above with regard to the other embodiments are applicable. Moreover, the tooth cleaning elements 404 may be omitted in some embodiments, depending on the particular personal care function to be performed by the personal care implement 400.

The handle 410 comprises a neck portion 411, a thumb grip portion 412, and a finger grip portion 413. The thumb grip portion 412 may comprise an elastomeric grip member as has been described above with the prior embodiments, although such a grip member is not required. The handle 410 has an outer surface 414 which comprises a front surface portion 415 and a rear surface portion 416. A recess 417 is formed into the outer surface 414. In the exemplified embodiment, the recess 417 is formed into the rear surface portion 416 of the outer surface 414. However, in alternative embodiments the recess 417 could be formed into the front surface portion 415 of the outer surface 414 or even along side surface portions of the outer surface 414 that extend between the front and rear surface portions 415, 416.

The recess 417 terminates in a floor 418. Furthermore, a first rib 419 protrudes from the floor 418 of the recess 417 and terminates in a distal end 420. The first rib 419 is essentially an upstanding wall that extends from the floor 418 of the recess 417 to the distal end 420 of the first rib 419. In the exemplified embodiment, the distal end 420 of the first rib 419 is flush or even with the rear surface portion 416 of the outer surface 414 of the handle 410, although the invention is not to be so limited in all embodiments and the distal end 420 of the first rib 419 could be recessed or protruding relative to the rear surface portion 416 in other embodiments. The first rib 419 is elongated in the direction of the longitudinal axis D-D. In the exemplified embodiment, the first rib 419 is located on the longitudinal axis D-D. In this embodiment, the first rib 419 is formed as an integral part of the body 401 along with the handle 410 and the head 402. However, the personal care implement 400 could have a structure that more closely resembles the personal care implement 300 with regard to it having a base structure and a monolithic overmold portion which forms the first rib 419. Thus, the features described herein relative to the cover member 450 could be incorporated into the personal care implement 300 in some embodiments.

Figure 19:
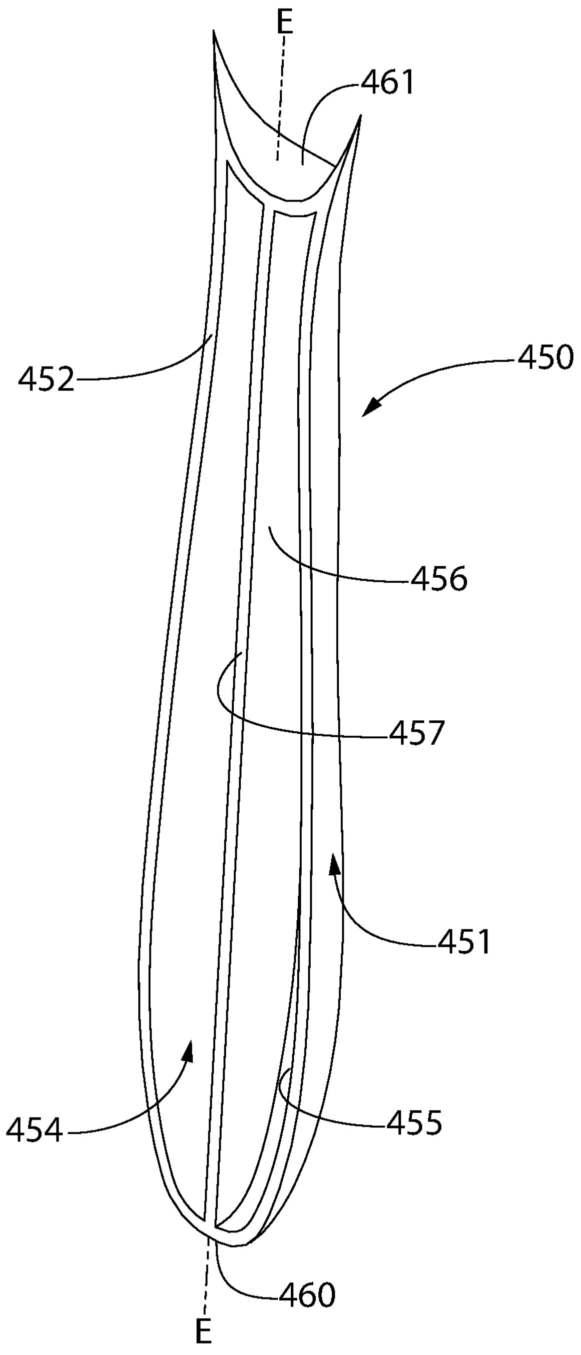
FIG. 19 is a rear perspective view of the cover member of the personal care implement of FIG. 18.

Referring to FIGS. 18 and 19, the cover member 450 will be described. The cover member 450 may be formed from a rigid material such as a hard plastic material (e.g., polypropylene or the like). The cover member 450 is intended to be coupled to the body 401 to cover the recess 417 and form a fully closed handle structure. The cover member 450 is elongated along a longitudinal axis E-E. Specifically, the cover member 450 extends from a first end 460 to a second end 461 along the longitudinal axis E-E.

The cover member 450 comprises an outer surface 451 that includes a front surface portion 452 and a rear surface portion 453. Furthermore, the cover member 450 comprises a recess 454 formed into the outer surface 451. In the exemplified embodiment, the recess 454 is formed into the front surface portion 452 of the outer surface 451. The recess 454 has a floor 455. In this embodiment, the cover member 450 comprises a second rib 456 extending from the floor 455 of the recess 454 to a distal end 457 of the second rib 457. Thus, the second rib 456 is an upstanding wall that protrudes upwardly from the floor 455 of the recess 454. The second rib 456 is elongated in a direction of the longitudinal axis E-E. Furthermore, the second rib 456 is located on the longitudinal axis E-E. The second rib 456 is formed as an integral part of the cover member 450 in the exemplified embodiment. Moreover, in the exemplified embodiment, the distal end 457 of the second rib 456 is flush or even with the rear surface portion 452 of the cover member 450. However, this is not required in all embodiments and the distal end 457 of the second rib 456 may be recessed relative to or protruding relative to the rear surface portion 452 of the cover member 450 in alternative embodiments.

Although not shown, in some embodiments one of the first and second ribs 419, 456 may have a slot formed into its respective distal end 420, 457 for receiving a portion of the other one of the first and second ribs 419, 456. Such an embodiment will be described in greater detail below with reference to FIG. 22B.

Figure 20:
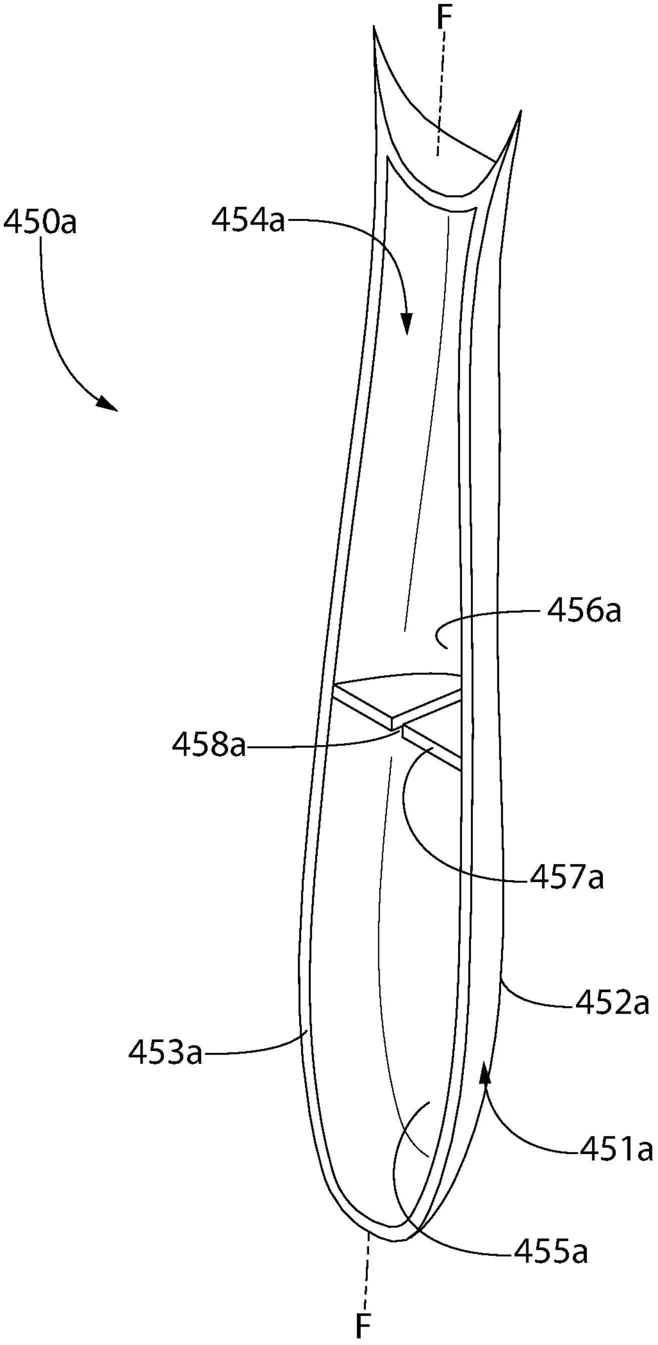
FIG. 20 is a rear perspective view of an alternative embodiment of the cover member of the personal care implement of FIG. 18.

FIG. 20 illustrates an alternative embodiment of a cover member 450*a*. The cover member 450*a* is identical to the cover member 450 except with regard to the structure of the rib. Specifically, the cover member 450*a* comprises an outer surface 451*a* that comprises a front surface portion 452*a* and a rear surface portion 453*a*. A recess 454*a* is formed into the outer surface 451*a*, and more specifically into the rear surface portion 453*a*. The recess 454*a* has a floor 455*a*. The cover member 450*a* is elongated along a longitudinal axis F-F.

The cover member 450*a* comprises a rib 456*a* that protrudes from the floor 455*a* of the recess 454*a* to a distal end 457*a*. The distal end 457*a* of the rib 456*a* may be flush with the rear surface portion 453*a* of the cover member 450*a* in some embodiments. In other embodiments, the distal end 457*a* of the rib 456*a* may be recessed relative to or may protrude from the rear surface portion 453*a* of the cover member 450*a*. In this embodiment, the rib 456*a* is oriented transverse, and more specifically perpendicular to the longitudinal axis F-F. That is, the rib 456*a* is elongated in a direction that is transverse or perpendicular to the longitudinal axis F-F of the cover member 450*a*.

The rib 456*a* comprises a slot 458*a* that extends downwardly from the distal end 457*a* of the rib 456*a* towards the floor 455*a* of the recess 454*a*. In the exemplified embodiment, the slot 458*a* extends all the way to the floor 455*a* of the recess 454*a*, thereby dividing the rib 456*a* into two separate and distinct walls. However, in other embodiments the slot 458*a* may extend part of the way down the rib 456*a* towards the floor 455*a*, but not the entire way. Moreover, while in the exemplified embodiment the slot 458*a* is a constant width measured in the direction transverse to the longitudinal axis F-F, in other embodiments the width 458*a* of the slot may decrease as it extends further from the distal end 457*a* of the rib 456*a*. The purpose of the slot 458*a* is to enable the first rib 419 of the body 401 to nest within the slot 458*a* when the cover member 450*a* is coupled to the body 401. Of course, in such embodiment the first rib 419 of the body 401 would have to protrude from the rear surface portion 416 of the body 401 or the second rib 456*a* of the cover member 450*a* would have to protrude from the rear surface portion 453*a* of the cover member 450*a* to enable the first rib 419 to nest within the slot 458*a*. In alternative embodiments, the first rib 419 may include such a slot that receives the second rib 456, 456*a* of the cover member 450, 450*a*.

Figure 21:
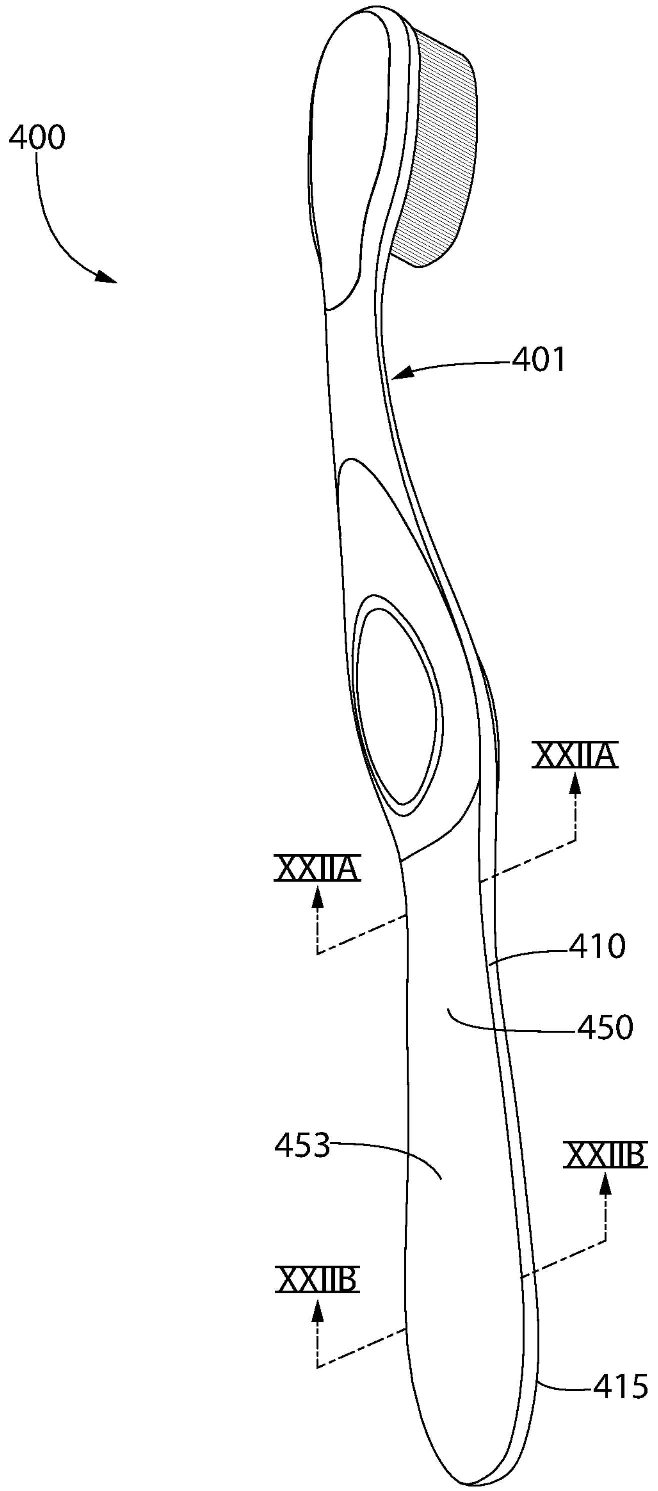
FIG. 21 is a rear view of the personal care implement of FIG. 18 in an assembled state.

Referring to FIG. 21, the personal care implement 400 is illustrated in a fully assembled state whereby the cover member 450 is attached to the body 401. The front surface portion 452 of the cover member 450 faces and contacts the rear surface portion 416 of the handle 410 of the body 401. When so assembled, the rear surface portion 453 of the cover member 450 forms the rear surface of the handle 410 and the front surface portion 415 of the body 401 forms the front surface of the handle 410.

Figure 22A:
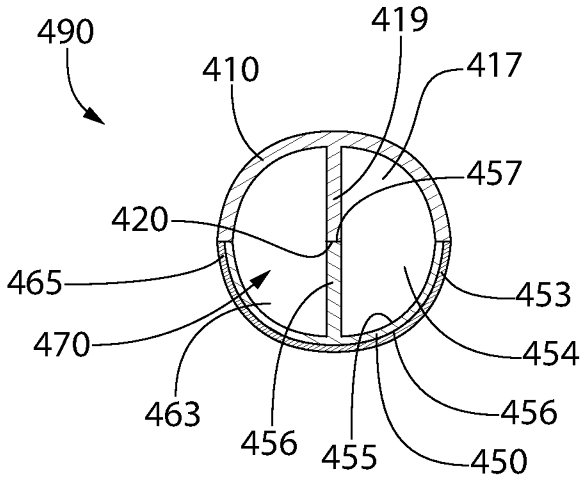
FIG. 22A is a cross-sectional view taken along line XXII-XXII of FIG. 21.

FIG. 22A illustrates a cross-sectional view taken through the handle 410 of FIG. 21. As seen, the recess 417 of the handle 410 of the body 401 and the recess 454 of the cover member 450 collectively form a handle cavity 470. Furthermore, the distal end 420 of the first rib 419 of the handle 410 of the body 401 abuts against or otherwise contacts the distal end 457 of the second rib 456 of the cover member 450. Moreover, the personal care implement 400 when assembled has a handle portion 490 formed collectively by the handle 410 of the body 401 and the cover member 450 which has a round cross-sectional area, similar to what a user might expect from a conventional personal care implement (e.g., toothbrush). However, the handle portion 490 of the personal care implement 400 is hollow, or at least partially hollow in that includes the handle cavity 470, thereby resulting in a significant reduction in plastic material used to form the personal care implement 400.

Moreover, in this embodiment the cover member 450 comprises a body portion 462 formed from a hard plastic material, the body portion 462 having an inner surface 463 that forms the floor 455 of the recess 454 and an outer surface 464 opposite the inner surface 463. Furthermore, the cover member 450 comprises a grip portion 465 formed from a thermoplastic elastomer that covers some, or all, of the outer surface 464 of the body portion 462. This can enhance the gripability of the personal care implement 400 for a user.

Figure 22B:
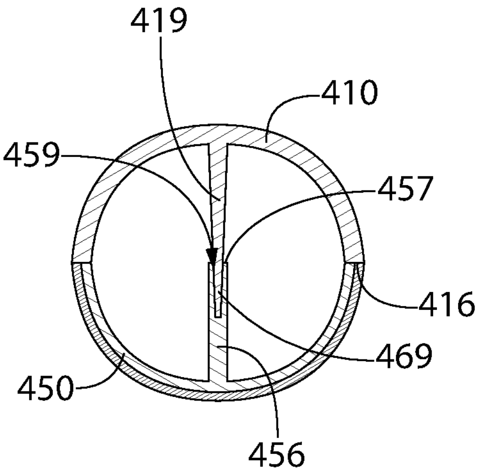
FIG. 22B is a cross-sectional view taken along line XXII-XXII of FIG. 21 in accordance with an alternative embodiment.

Referring to FIG. 22B, an alternative cross-sectional view of the personal care implement 400 is provided. In this embodiment, the rib 419 of the handle 410 of the body 401 protrudes beyond the rear surface 416 of the handle 410 of the body 401. Furthermore, in this embodiment the rib 456 of the cover member 450 comprises a slot 459 that extends downwardly from the distal end 457 of the rib 456. Thus, when the cover member 450 is coupled to the handle 410 of the body 401, a distal portion 469 of the rib 419 of the handle 410 of the body 401 nests within the slot 459 in the rib 456 of the cover member 450. In alternative embodiments, the opposite may occur and a distal portion of the rib 456 of the cover member 450 may nest within a slot in the rib 419 of the handle 410 of the body 401. In some embodiments, the engagement between the two ribs 419, 456 may result in a friction fit or some type of mechanical interlocking engagement between the two ribs 419, 456 to assist with the coupling of the cover member 450 to the body 401. Moreover, the cover member 450*a* shown in FIG. 20 could be used to achieve a similar type of attachment between the first rib 419 and the second rib 456*a*.

Figure 23:
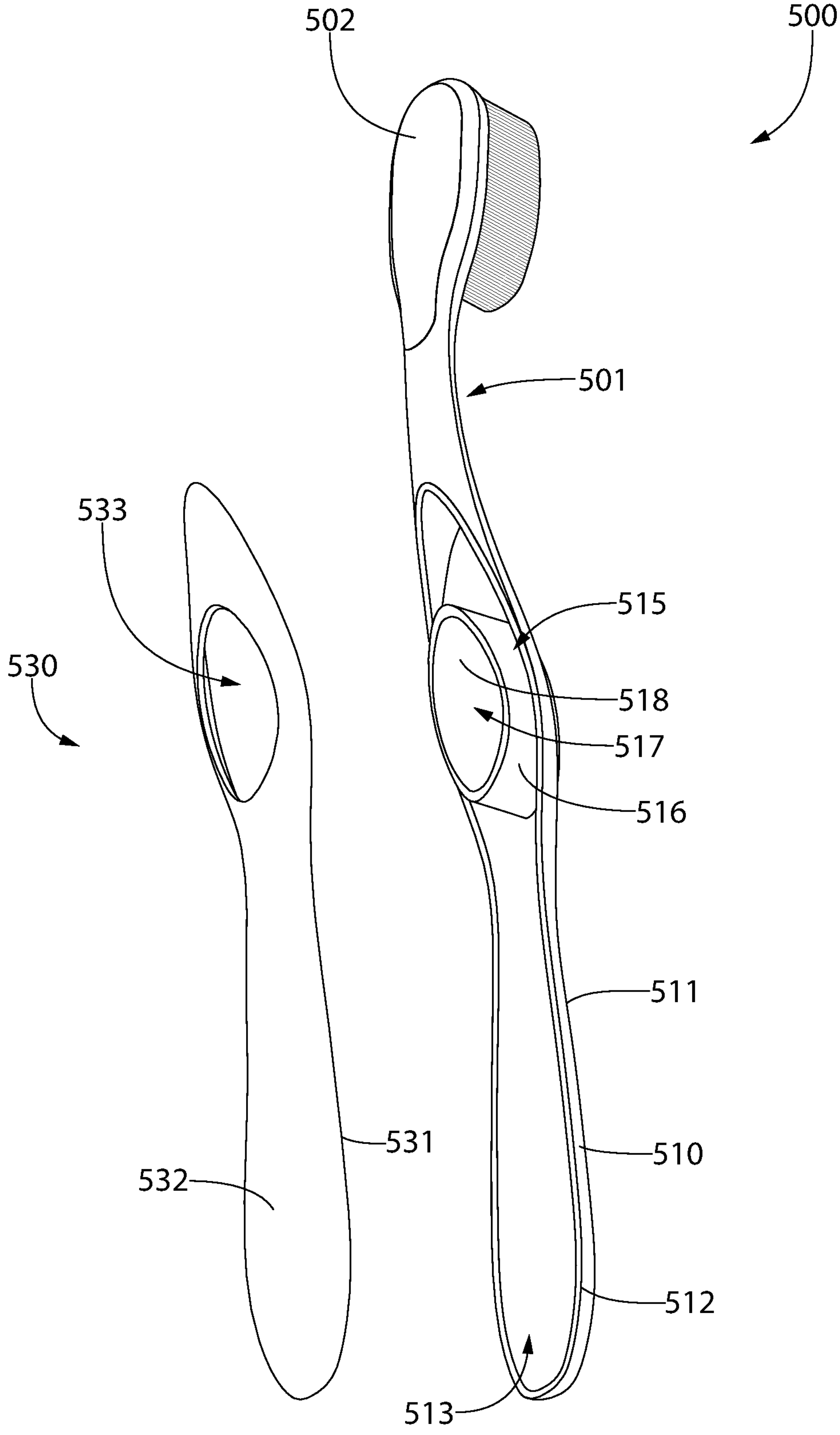
FIG. 23 is a rear perspective view of a personal care implement in accordance with a further embodiment of the present invention, whereby a cover member is detached from a body thereof.
Figure 24:
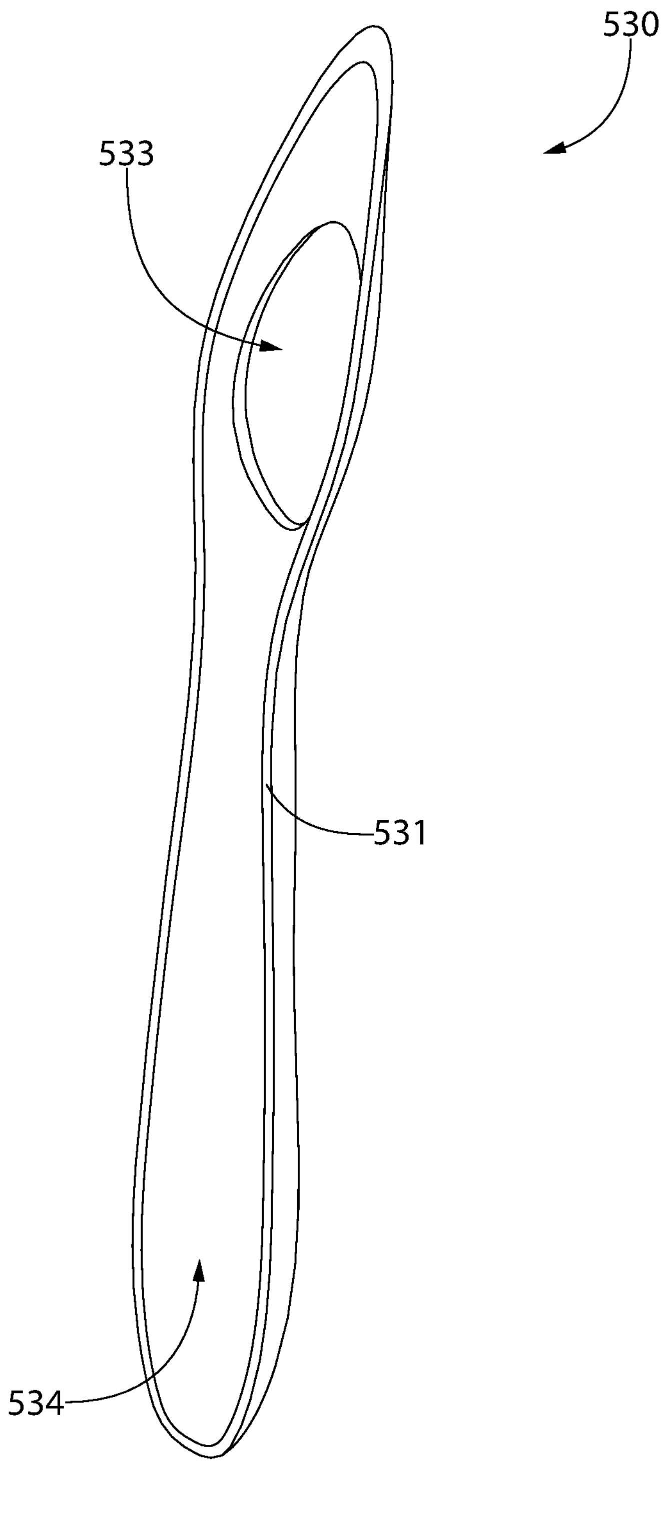
FIG. 24 is a rear perspective view of the cover member of the personal care implement of FIG. 23.

Referring to FIGS. 23 and 24, another embodiment of a personal care implement 500 is illustrated. The personal care implement 500 comprises a body 501 and a cover member 530 that is detachably coupled to the body 501. In particular, the body 501 comprises a head 502 and a handle 510. The handle 510 comprises a front surface 511 and a rear surface 512. Furthermore, a first recess 513 is formed into the rear surface 512 of the handle 510. In other embodiments the first recess 513 may be formed into the front surface 511 of the handle 510. The handle 510 also comprises a thumb grip region 515. Within the thumb grip region 515, the handle 510 comprises an annular wall 516 that defines a through-hole 517 and an elastomeric grip component 518 that is disposed within the through-hole 517 and surrounded by the annular wall 516.

Figure 25:
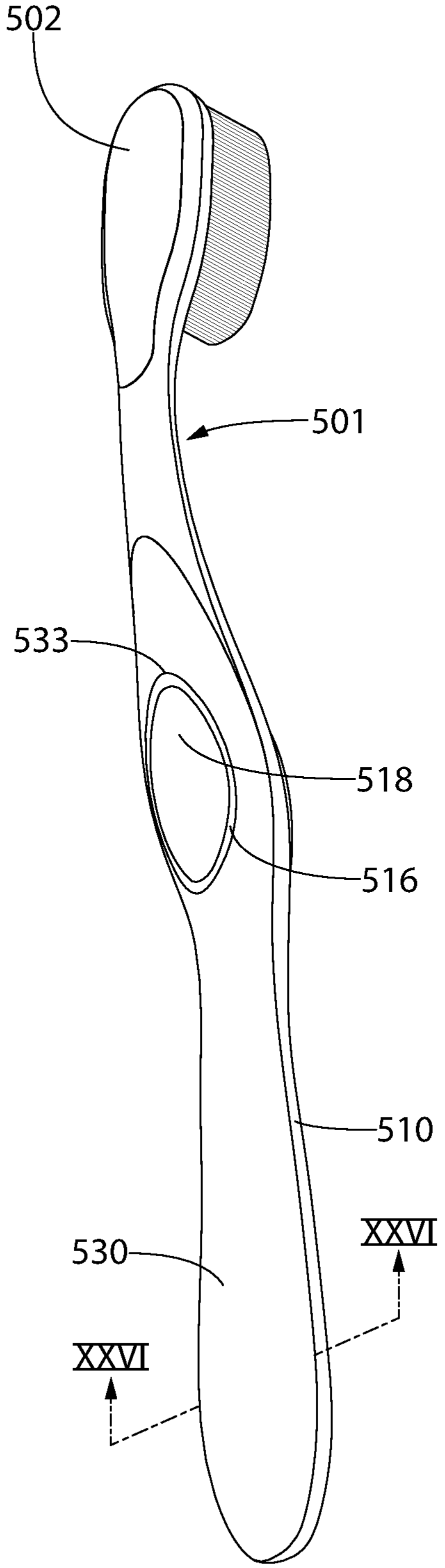
FIG. 25 is a rear perspective view of the personal care implement of FIG. 23 in an assembled state.
Figure 26:
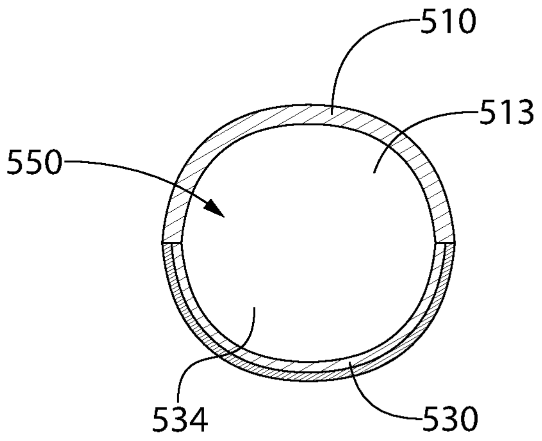
FIG. 26 is a cross-sectional view taken along line XXVI-XXVI of FIG. 25.

The cover member 530 comprises a front surface 531 and a rear surface 532. The cover member 530 comprises an aperture 533 that extends through the cover member 530 from the front surface 531 to the rear surface 532. Furthermore, the cover member 530 comprises a recess 534 in the front surface 531. As shown in FIGS. 25 and 26, the cover member 530 is attached to the body 501 so that the first recess 513 of the handle 510 and the recess 534 of the cover member 530 are aligned and collectively define a handle cavity 550. Furthermore, the annular wall 516 and elastomeric grip component 518 of the thumb grip region 515 of the handle 510 extends into the aperture 533 in the cover member 530. In the embodiment of FIGS. 23-25, there are no rib features protruding from the floors of the recesses 513, 534. However, ribs or rib structures could be included as described above with regard to FIGS. 18 and 19, for example.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A personal care implement comprising:

a body extending along a longitudinal axis and comprising a head configured to perform a personal care function and a handle configured to be gripped by a user during performance of the personal care function, the handle comprising a thumb grip portion and a finger grip portion that extends from the thumb grip portion to a distal end of the handle that is located furthest from the head;

wherein the finger grip portion of the handle has a generally U-shaped transverse cross-sectional area that defines a recess in a rear surface of the finger grip portion, the recess being elongated in a direction of the longitudinal axis;

wherein the finger grip portion of the handle comprises a first portion formed of a hard plastic material and a second portion formed of an elastomeric material, the first portion being generally U-shaped and comprising a convex front surface, a concave rear surface, and a distal edge that extends between the convex front surface and the concave rear surface, the distal edge and the concave rear surface facing in a same direction, the second portion covering and protruding from the distal edge of the first portion; and wherein the second portion of the finger grip portion does not cover the convex front surface of the first portion of the finger grip portion.

2. The personal care implement according to claim 1 wherein the recess has a width measured in a direction transverse to the longitudinal axis, the width decreasing moving in a direction from the distal end of the handle towards the thumb grip along at least a portion of the finger grip portion.

3. The personal care implement according to claim 1 wherein the rear surface of the finger grip portion forms a floor of the recess along an entirety of the recess.

4. The personal care implement according to claim 3 wherein the second portion of the finger grip portion has a height measured from the distal end of the first portion of the finger grip portion to a terminal end of the second portion of the finger grip portion, the height being in a range of 2.5 mm to 5.0 mm.

5. The personal care implement according to claim 1 wherein the recess is open at the distal end of the handle.

6. The personal care implement according to claim 1 wherein the first portion comprises a first color and the second portion comprises a second color that is different than the first color.

7. The personal care implement according to claim 1 wherein along the rear surface of the finger grip portion of the handle, the elastomeric material of the second portion forms a closed loop that surrounds an exposed portion of the rigid material of the first portion.

8. The personal care implement according to claim 1 wherein the second portion of the finger grip portion of the handle covers a substantial entirety of the distal edge of the first portion of the finger grip portion of the handle.

9. The personal care implement according claim 1 wherein the second portion of the finger grip portion of the handle comprises a first portion located on a first side of the longitudinal axis and a second portion located on a second side of the longitudinal axis, each of the first and second portions of the second portion of the finger grip portion of the handle being arcuate and curved inwardly towards the longitudinal axis.

10. The personal care implement according to claim 1 further comprising a longitudinally elongated rib protruding from the rear surface of the finger grip portion of the handle, the longitudinally elongated rib being aligned with the longitudinal axis of the personal care implement.

11. The personal care implement according to claim 1 wherein the finger grip portion of the handle comprises a front surface and the rear surface and a thickness measured between the front and rear surfaces, the thickness being between 1.5 mm and 2.5 mm.

12. The personal care implement according to claim 1 wherein the convex front surface of the first portion forms an entirety of an exposed front surface of the finger grip portion of the handle.

13. A personal care implement having a longitudinal axis and comprising:

a head configured to perform a personal care function;

a handle coupled to the head and configured to be gripped by a user during performance of the personal care function, the handle comprising a distal axial portion that comprises a distal end of the handle that is located furthest from the head; and wherein the distal axial portion of the handle comprises:

a recess that is elongated in a direction of the longitudinal axis;

a first portion formed from a rigid material and comprising a front surface, a rear surface opposite the front surface, and a distal edge extending between the front and rear surfaces that at least partially surrounds the recess, the front surface being convex in a direction transverse to the longitudinal axis and the rear surface being concave in the direction transverse to the longitudinal axis and forming a floor of the recess, wherein the distal edge and the rear surface face in a same direction; and a second portion formed from an elastomeric material that covers the distal edge of the first portion; and wherein the front surface of the first portion of the distal axial portion of the handle is not covered by the second portion such that the front surface of the first portion of the distal axial portion forms an entirety of an exposed front surface of the distal axial portion of the handle.

14. The personal care implement according to claim 13 wherein the first portion of the distal axial portion of the handle is free of any apertures extending between the front and rear surfaces.

15. The personal care implement according to claim 14 wherein the first portion comprises a rib protruding from the floor of the recess, the rib being located on and elongated along the longitudinal axis.

16. The personal care implement according to claim 13 wherein the second portion of the distal axial portion of the handle surrounds an exposed portion of the rear surface of the first portion of the distal axial portion of the handle, the exposed portion of the rear surface of the first portion forming at least a portion of the floor of the recess.

17. The personal care implement according to claim 13 wherein the first portion of the distal axial portion of the handle has a generally U-shaped transverse cross-sectional area comprising a first sidewall located on a first side of the longitudinal axis and a second sidewall located on a second side of the longitudinal axis, terminal ends of the first and second sidewalls forming at least a portion of the distal edge of the first portion of the distal axial portion of the handle, and wherein the second portion of the distal axial portion of the handle comprises a first sidewall that extends from the terminal end of the first sidewall of the first portion of the distal axial portion of the handle and a second sidewall that extends from the terminal end of the second sidewall of the first portion of the distal axial portion of the handle, the first and second sidewalls of the second portion of the distal axial portion of the handle located on opposite sides of the longitudinal axis.

18. The personal care implement according to claim 17 wherein the first and second sidewalls of the second portion of the distal axial portion of the handle are arcuate and curved inwardly towards the longitudinal axis.

19. A personal care implement comprising:

a body extending along a longitudinal axis and comprising a head configured to perform a personal care function and a handle configured to be gripped by a user during performance of the personal care function, the handle comprising a thumb grip portion and a finger grip portion that extends from the thumb grip portion to a distal end of the handle that is located furthest from the head;

wherein the finger grip portion of the handle has a generally U-shaped transverse cross-sectional area that defines a recess in a rear surface of the finger grip portion, the recess being elongated in a direction of the longitudinal axis;

wherein the finger grip portion of the handle comprises a first portion formed of a hard plastic material and a second portion formed of an elastomeric material, the first portion comprising a convex front surface, a concave rear surface, and a distal edge that extends between the front and rear surfaces, the distal edge and the concave rear surface facing in a same direction, the second portion covering and protruding from the distal edge of the first portion; and wherein an entirety of an exposed front surface of the handle is formed by the convex front surface of the finger grip portion.

* * * * *